US012645439B2

(12) United States Patent
Liu et al.

(10) Patent No.: US 12,645,439 B2
(45) Date of Patent: Jun. 2, 2026

(54) PROGRAM COMPILATION METHOD AND APPARATUS

(71) Applicant: HUAWEI TECHNOLOGIES CO., LTD., Shenzhen (CN)

(72) Inventors: Zhikang Liu, Hangzhou (CN); Lingfei Wu, Hangzhou (CN); Jinglei Lu, Hangzhou (CN); Ziming Xu, Hangzhou (CN); Chen Cheng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 18/407,383

(22) Filed: Jan. 8, 2024

(65) Prior Publication Data

US 2024/0201968 A1 Jun. 20, 2024

Related U.S. Application Data

(63) Continuation of application No. PCT/CN2022/103415, filed on Jul. 1, 2022.

(30) Foreign Application Priority Data

Jul. 9, 2021 (CN) .......................... 202110781901.9

(51) Int. Cl.
G06F 8/41 (2018.01)
(52) U.S. Cl.
CPC .................................. G06F 8/4441 (2013.01)
(58) Field of Classification Search
CPC ..................................................... G06F 8/4441
USPC ......................................................... 717/151
See application file for complete search history.

(56) References Cited

U.S. PATENT DOCUMENTS

| | | | |
|---|---|---|---|
| 5,797,013 A | 8/1998 | Mahadevan et al. | |
| 5,949,995 A * | 9/1999 | Freeman ............... | G06F 9/3844 |
| | | | 717/130 |
| 7,395,531 B2 * | 7/2008 | Eichenberger .......... | G06F 8/447 |
| | | | 717/160 |
| 7,882,498 B2 * | 2/2011 | Ottoni ..................... | G06F 8/456 |
| | | | 717/160 |

(Continued)

FOREIGN PATENT DOCUMENTS

CN          113672232 A      11/2021

OTHER PUBLICATIONS

Mohammad Ali Ghodrat et al:"Control flow optimization in loops using interval analysis", 2008 International Conference on Compilers,Architectures and Synthesis for Embedded Systems (CASES'08), Oct. 19, 2008 (Oct. 19, 2008), XP058164897, total 10 pages.

*Primary Examiner* — Wei Y Mui
*Assistant Examiner* — Amir Soltanzadeh

(57) ABSTRACT

This application discloses a program compilation method including: obtaining a first program, where the first program includes a plurality of layers of loop statements, a loop condition of each layer of loop statement in the plurality of layers of loop statements includes a variable and a value interval of the variable, and a loop body of the plurality of layers of loop statements includes at least one conditional statement; processing a value interval of a first variable in a first loop statement included in the plurality of layers of loop statements, to obtain a second loop statement; and compiling the first program based on at least one loop statement to obtain a compilation result of the first program.

13 Claims, 8 Drawing Sheets

300

(56)  References Cited

U.S. PATENT DOCUMENTS

| 8,028,281 B2 * | 9/2011 | Bera | G06F 8/452 |
| | | | 717/160 |
| 2001/0011371 A1 * | 8/2001 | Tang | G06F 8/41 |
| | | | 717/160 |
| 2007/0022412 A1 * | 1/2007 | Tirumalai | G06F 9/485 |
| | | | 717/151 |
| 2007/0169061 A1 * | 7/2007 | Bera | G06F 8/452 |
| | | | 717/160 |
| 2012/0192169 A1 | 7/2012 | Li et al. | |

* cited by examiner

```
1 for (C1, 0, 3) { //C1 axis
2    for (H_o, 0, 3) { //quantity of data blocks on an H axis after partition
3    //attr pragma_emit_insn = "vmuls"
4      for (H_i, 0, 5) { //partition factor used for partition performed by using 5 as a unit
5       for (W, 0, 8) {
6        for (C0, 0, 16) {
7         if ((((H_o*5) + H_i) < 12)) { //conditional branch for a tail block
8          C(C1_i, H_o, H_i, W, C0) = A(C1_i, H_o, H_i, W, C0) * 2;
9           }}}}}}
```

Partition along an H axis

Figure 5:
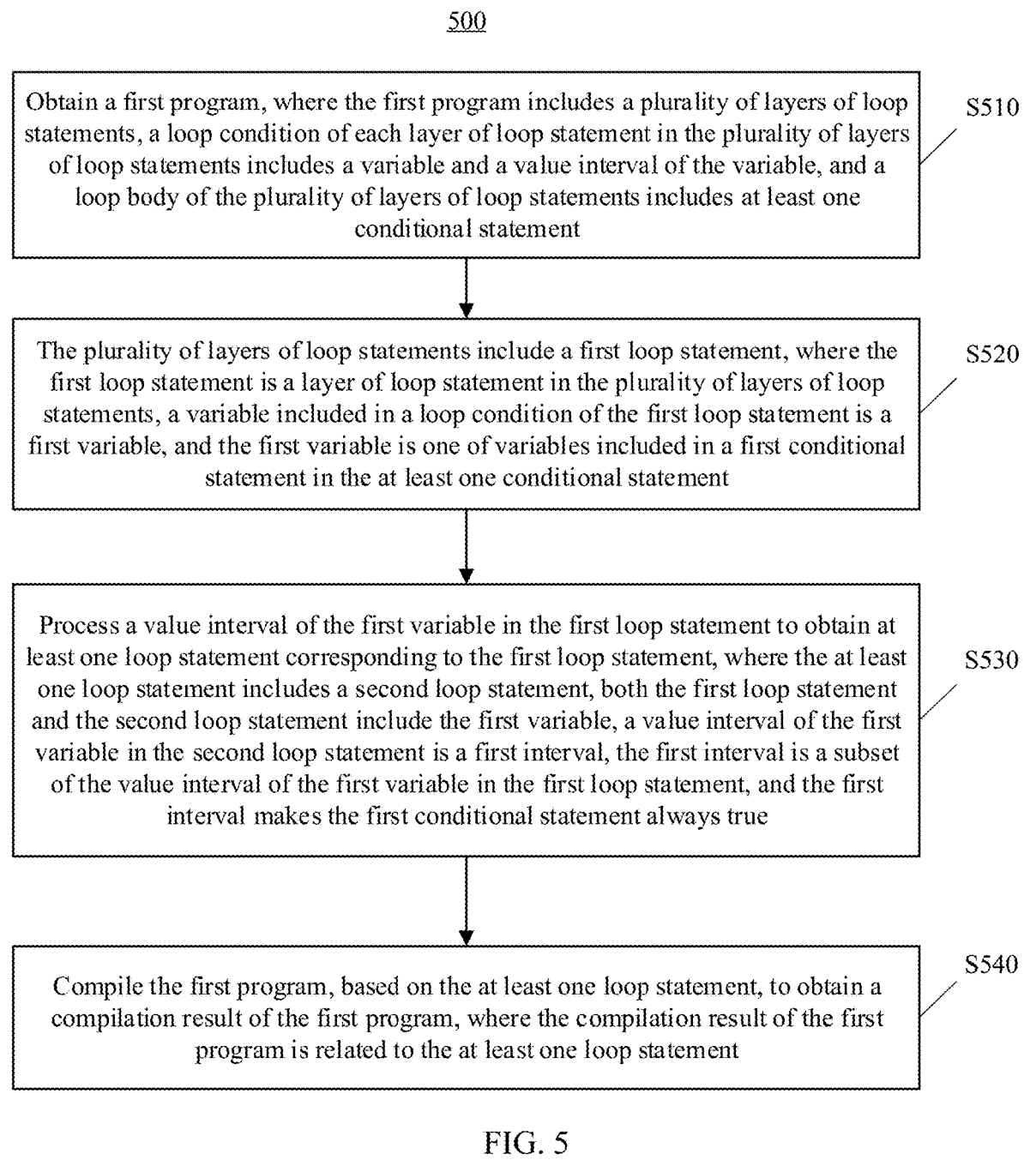

500

Obtain a first program, where the first program includes a plurality of layers of loop statements, a loop condition of each layer of loop statement in the plurality of layers of loop statements includes a variable and a value interval of the variable, and a loop body of the plurality of layers of loop statements includes at least one conditional statement
S510

The plurality of layers of loop statements include a first loop statement, where the first loop statement is a layer of loop statement in the plurality of layers of loop statements, a variable included in a loop condition of the first loop statement is a first variable, and the first variable is one of variables included in a first conditional statement in the at least one conditional statement
S520

Process a value interval of the first variable in the first loop statement to obtain at least one loop statement corresponding to the first loop statement, where the at least one loop statement includes a second loop statement, both the first loop statement and the second loop statement include the first variable, a value interval of the first variable in the second loop statement is a first interval, the first interval is a subset of the value interval of the first variable in the first loop statement, and the first interval makes the first conditional statement always true
S530

Compile the first program, based on the at least one loop statement, to obtain a compilation result of the first program, where the compilation result of the first program is related to the at least one loop statement
S540

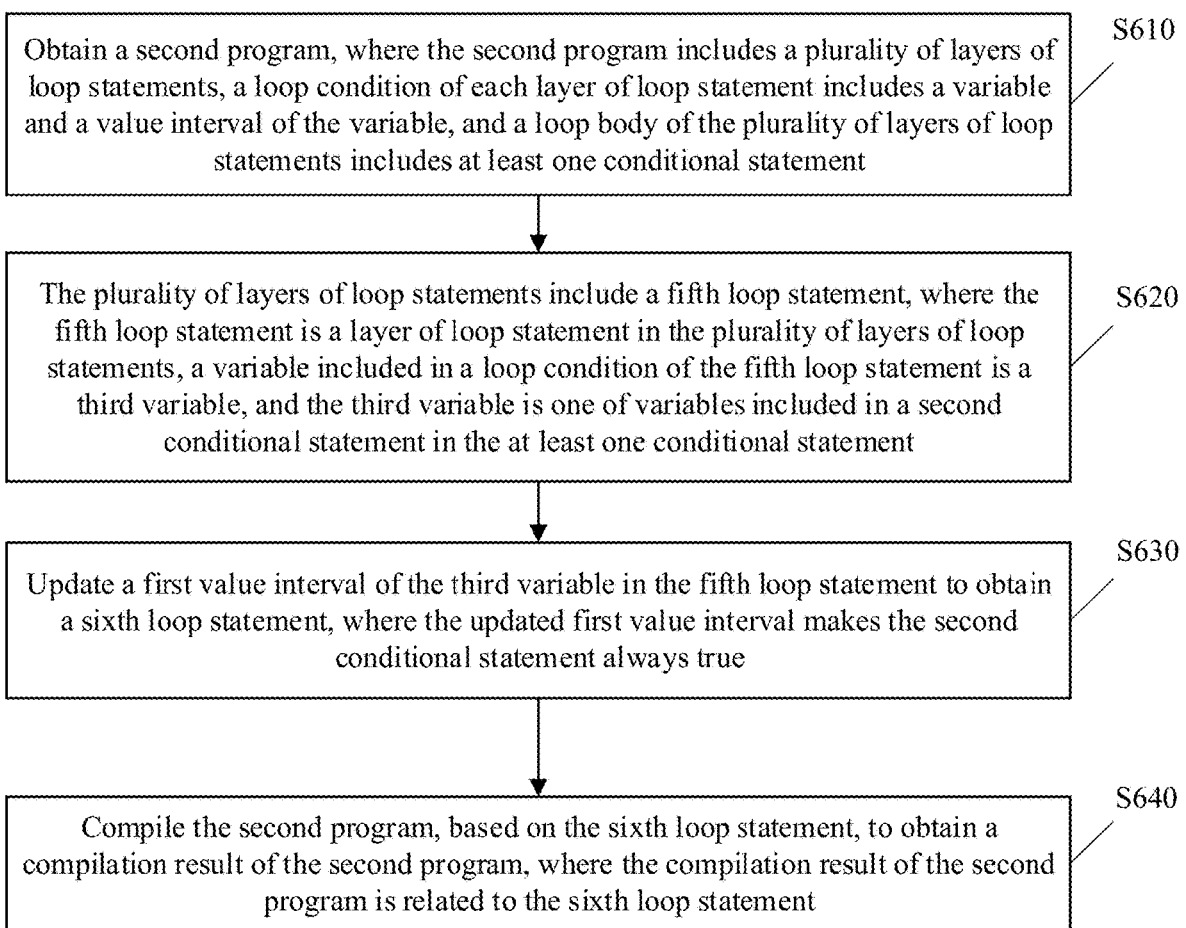

Obtain a second program, where the second program includes a plurality of layers of loop statements, a loop condition of each layer of loop statement includes a variable and a value interval of the variable, and a loop body of the plurality of layers of loop statements includes at least one conditional statement

S610

The plurality of layers of loop statements include a fifth loop statement, where the fifth loop statement is a layer of loop statement in the plurality of layers of loop statements, a variable included in a loop condition of the fifth loop statement is a third variable, and the third variable is one of variables included in a second conditional statement in the at least one conditional statement

S620

Update a first value interval of the third variable in the fifth loop statement to obtain a sixth loop statement, where the updated first value interval makes the second conditional statement always true

S630

Compile the second program, based on the sixth loop statement, to obtain a compilation result of the second program, where the compilation result of the second program is related to the sixth loop statement

PROGRAM COMPILATION METHOD AND APPARATUS

CROSS-REFERENCE TO RELATED APPLICATIONS

This application is a continuation of International Application No. PCT/CN2022/103415, filed on Jul. 1, 2022, which claims priority to Chinese Patent Application No. 202110781901.9, filed on Jul. 9, 2021. The disclosures of the aforementioned applications are hereby incorporated by reference in their entireties.

TECHNICAL FIELD

This application relates to the field of information technologies, and in particular, to a program compilation method and apparatus.

BACKGROUND

With rapid development of artificial intelligence technologies, a conventional graphics processing unit (GPU) and a central processing unit (CPU) can no longer meet increasing performance requirements. Therefore, researchers in the industry start to focus on research on artificial intelligence (AI) chips to meet performance requirements in the AI field. On an AI system stack, block-based computing is an inevitable part of multi-dimensional data due to hardware limitations. A block-based policy directly causes performance problems to the AI chips. AI chips often process multi-dimensional data, which is represented by multi-layer nested loops in programs. During processing, the multi-dimensional data is mapped to an instruction. This mapping process is referred to as tensorization.

However, in an actual scenario, because branch and jump instructions are included in the multi-layer nested loops, a tensorization process is blocked, and therefore a quantity of instructions to which the multi-dimensional data is mapped is limited to some extent. As shown in FIG. 1, in a program representation of multi-dimensional data, an instruction mapping label, vmuls, is originally added to an H_o axis, and all program code with the instruction mapping label generates an instruction that includes a determined execution process. However, due to limitation of an if condition (that is, program execution is indefinite), in a process of mapping the multi-dimensional data, the instruction mapping label needs to be moved to a following line of an if conditional branch, so that a quantity of generated instructions is far greater than a theoretical quantity of 9.

Therefore, when the multi-dimensional data is irregularly partitioned in a process of mapping the multi-dimensional data, data in a tail block cannot be effectively tensorized, which seriously affects execution of an efficient instruction transmission mode: single instruction, multiple data (SIMD).

In a compilation process in a conventional technology, a multi-layer nested loop in a multi-dimensional data program is fully expanded (expanded by using 1 as a unit), to eliminate branch jumps, thereby improving instruction transmission efficiency. However, this full expansion manner greatly increases a code length in a program compilation result, and further increases mapping duration of the program compilation result.

SUMMARY

Embodiments of this application provide a program compilation method and apparatus, to reduce a code length in a compilation result of a program while improving instruction transmission efficiency and enhancing running performance of the compilation result of the program, and obtain short mapping duration of the compilation result of the program.

According to a first aspect, this application provides a program compilation method. The method includes: obtaining a first program, where the first program includes a plurality of layers of loop statements, a loop condition of each layer of loop statement in the plurality of layers of loop statements includes a variable and a value interval of the variable, and a loop body of the plurality of layers of loop statements includes at least one conditional statement; where the plurality of layers of loop statements include a first loop statement, where the first loop statement is a layer of loop statement in the plurality of layers of loop statements, a variable included in a loop condition of the first loop statement is a first variable, and the first variable is one of variables included in a first conditional statement in the at least one conditional statement; processing a value interval of the first variable in the first loop statement to obtain at least one loop statement corresponding to the first loop statement, where the at least one loop statement includes a second loop statement, both the first loop statement and the second loop statement include the first variable, a value interval of the first variable in the second loop statement is a first interval, the first interval is a subset of the value interval of the first variable in the first loop statement, and the first interval makes the first conditional statement always true; and compiling the first program based on the at least one loop statement, to obtain a compilation result of the first program, where the compilation result of the first program is related to the at least one loop statement.

The first program including the plurality of layers of loop statements may be used to represent multi-dimensional data. The compilation result of the first program may correspondingly be program representation of partitioned multi-dimensional data.

The compilation result of the first program is program representation in a high-level language (C, C++, python, or the like). The compilation result of the first program can only be converted into an executable instruction on hardware (for example, a CPU or a GPU) after subsequent processing such as instruction mapping.

It should be understood that processing the value interval of the first variable in the first loop statement is equivalent to expanding the value interval of the first variable. When the first program further includes other loop statements that need to be processed, value intervals of variables included in loop conditions in the other loop statements may be sequentially expanded with reference to the manner of expanding the value interval of the first variable in the first loop statement. After a last loop statement that needs to be processed is expanded, the compilation result of the first program is obtained. In other words, the compilation result of the first program is related to the at least one loop statement.

In addition, in this embodiment of this application, the loop statements that need to be processed may be sequentially expanded from the outermost loop statement to the innermost loop statement or from the innermost loop statement to the outermost loop statement. The outermost loop statement is a layer of loop statement at the top of the first program, and the innermost loop statement is a layer of loop statement at the bottom of the first program.

With respect to technical effects, when the first variable is a value in the first interval, the first conditional statement may always be true, and the value interval of the first variable in the second loop statement is the first interval. Therefore, the first conditional statement in the second loop statement may be eliminated, and a quantity of instructions obtained through mapping may be reduced in a process of mapping the compilation result of the first program (multi-dimensional data obtained after partition). This improves instruction transmission efficiency in the mapping process, and enhances running performance of the compilation result of the first program. In addition, in a conventional technology, a value interval of the first variable is fully expanded (that is, the value interval of the first variable is expanded by using 1 as a unit), to eliminate the first conditional statement. In this application, because the first conditional statement is always true when the first variable is a value in the first interval, the value interval of the first variable in the first loop statement may be expanded in a form of an interval. Therefore, a code length of the second loop statement obtained after expansion can be effectively reduced, that is, a code length in the compilation result of the first program is reduced, thereby reducing mapping duration of the subsequent compilation result of the first program.

In an implementation, the first program includes an instruction mapping label; and when an estimated mapping time of the compilation result of the first program is greater than a preset time, the first variable is one of variables included in both the at least one conditional statement and loop conditions of loop statements following the instruction mapping label, and the estimated mapping time is a time required for mapping the compilation result of the first program to an executable instruction on hardware; or when the estimated mapping time of the compilation result of the first program is less than or equal to the preset time, the first variable is one of variables included in both the at least one conditional statement and loop conditions of all of the plurality of layers of loop statements.

With respect to technical effects, when the estimated mapping time of the compilation result of the first program is greater than the preset time, to control the mapping duration of the compilation result, in this case, only value intervals of the variables included in both the at least one conditional statement and the loop conditions of the loop statements following the instruction mapping label are sequentially processed. In this way, a quantity of processed loop statements is reduced, the code length in the compilation result is reduced, and the mapping duration of the compilation result of the program is reduced. In addition, when the estimated mapping time of the compilation result of the first program is less than or equal to the preset time, value intervals of all the variables included in both the at least one conditional statement and the loop conditions of all of the plurality of layers of loop statements may be sequentially processed. In this case, the conditional statement in the first program may be eliminated to the greatest extent, so that a quantity of instructions obtained by mapping the compilation result of the first program is reduced, that is, high-performance instructions are obtained.

In an implementation, the estimated mapping time of the compilation result of the first program is determined based on one or more of a quantity of variables included in the at least one conditional statement, a quantity of layers of the plurality of layers of loop statements, fuzzy intervals of the variables included in the at least one conditional statement, or a quantity of conditional statements. When a value of the variable is a value in a fuzzy interval of the variable, whether a conditional statement including the variable is true is further related to another factor.

The another factor refers to another variable in the conditional statement. In other words, whether the conditional statement including the variable is true is jointly determined by the variable and the another variable in the conditional statement including the variable.

With respect to technical effects, the code length in the compilation result of the first program may be obtained through calculation using the quantity of variables in the at least one conditional statement, the quantity of layers of the plurality of layers of loop statements, the fuzzy intervals of the variables, and the quantity of conditional statements in the at least one conditional statement. Therefore, accurate mapping duration may be obtained through calculation based on the foregoing parameters, and a quantity of variables that need to be processed is determined (that is, a layer of loop statement at which the variable is located is correspondingly determined) based on the mapping duration. In this way, instruction transmission efficiency and the mapping duration of the compilation result of the first program are ensured, that is, instruction transmission efficiency is high and the mapping duration is short for the compilation result of the first program.

In an implementation, the at least one loop statement corresponding to the first loop statement further includes a third loop statement. A value interval of the first variable in the third loop statement is a second interval, and when a value of the first variable is a value in the second interval, whether the first conditional statement is true is further related to another factor.

The another factor refers to another variable in the first conditional statement. In other words, whether the first conditional statement including the first variable is true is jointly determined by the first variable and the another variable in the first conditional statement.

The third loop statement is obtained with the second loop statement after the first loop statement is expanded. The first interval and the second interval are subsets of the value interval of the first variable in the first loop statement. The second interval is a fuzzy interval of the first variable.

In views of technical effects, because the first conditional statement in the second loop statement is always true, and whether the first conditional statement in the third loop statement is true is jointly determined by the first variable and another variable in the first conditional statement, the first loop statement is expanded into the second loop statement and the third loop statement for differentiation, to eliminate the first conditional statement in the second loop statement. In addition, when the first conditional statement further includes another variable, the third loop statement may be further expanded subsequently, to eliminate the first conditional statement.

In an implementation, the first conditional statement further includes a second variable. The method further includes: when the estimated mapping time of the compilation result of the first program is greater than the preset time, and the second variable is one of the variables included in both the at least one conditional statement and the loop conditions of the loop statements following the instruction mapping label; or when the estimated mapping time of the compilation result of the first program is less than or equal to the preset time, and the second variable is one of the variables included in both the at least one conditional statement and the loop conditions of all of the plurality of layers of loop statements, processing the second interval of the first variable in the third loop statement to obtain one or more fourth loop statements. A value interval of the first variable in each of the fourth loop statements is a subset of a value interval of the first variable in the third loop statement.

The processing the second interval of the first variable in the third loop statement is expanding the second interval with 1 as the bit.

With respect to technical effects, whether the first conditional statement in the third loop statement is true is jointly determined by values of the first variable and the second variable. Therefore, a second interval corresponding to the value of the first variable may be first expanded, and a value of the second variable in each fourth loop statement is correspondingly determined, so that the first conditional statement in each fourth loop statement is always true, to eliminate the first conditional statement in each fourth loop statement. This further reduces instructions generated during compilation result mapping, improves instruction transmission efficiency, and therefore obtains a high-performance program compilation result.

In an implementation, the first conditional statement further includes a second variable, and a value interval of the second variable in the third loop statement is a third interval. The method further includes: when the estimated mapping time of the compilation result of the first program is greater than the preset time, and the second variable is a variable included in a loop condition of a loop statement above the instruction mapping label, processing the third interval in the third loop statement to obtain one or more fifth loop statements, where a value interval of the second variable in each of the fifth loop statements is a subset of the third interval.

The processing the third interval in the third loop statement is expanding the third interval by using 1 as a unit.

With respect to technical effects, whether the first conditional statement in the third loop statement is true is jointly determined by values of the first variable and the second variable. Therefore, a value interval (the third interval) corresponding to the second variable in the third loop statement may be expanded, and a value of the first variable in each fifth loop statement is determined, so that the first conditional statement in each fifth loop statement is always true, to eliminate the first conditional statement in each fifth loop statement. This further reduces instructions generated during subsequent compilation result mapping, and improves instruction transmission efficiency.

In an implementation, two endpoints of the value interval of the variable included in the loop condition of each layer of loop statement are constants, and the variables included in the at least one conditional statement are variables included in loop conditions of the plurality of layers of loop statements.

With respect to technical effects, value intervals of variables included in the loop conditions of the plurality of layers of loop statements are constants, and the variable included in each conditional statement is a variable included in the loop conditions of the plurality of layers of loop statements. Therefore, values of endpoints of the first interval and the second interval that are obtained based on the first conditional statement and the value interval of the first variable are constants. Then, the second interval in the third loop statement may continue to be expanded, to eliminate the first conditional statement in each fourth loop statement, so that instructions generated during subsequent compilation result mapping are reduced, and instruction transmission efficiency is improved.

According to a second aspect, this application provides a program compilation method. The method includes: obtaining a second program, where the second program includes a plurality of layers of loop statements, a loop condition of each layer of loop statement includes a variable and a value interval of the variable, and a loop body of the plurality of layers of loop statements includes at least one conditional statement; and the plurality of layers of loop statements include a fifth loop statement, where the fifth loop statement is a layer of loop statement in the plurality of layers of loop statements, a variable included in a loop condition of the fifth loop statement is a third variable, and the third variable is one of variables included in a second conditional statement in the at least one conditional statement; updating a first value interval of the third variable in the fifth loop statement to obtain a sixth loop statement, where the updated first value interval makes the second conditional statement always true; and compiling the second program based on the sixth loop statement, to obtain a compilation result of the second program, where the compilation result of the second program is related to the sixth loop statement.

The second program including the plurality of layers of loop statements may be used to represent multi-dimensional data. The compilation result of the second program may correspondingly be program representation of partitioned multi-dimensional data.

The compilation result of the second program is program representation in a high-level language (C, C++, python, or the like). The compilation result of the second program can only be converted into an executable instruction on hardware (for example, a CPU or a GPU) after subsequent processing such as instruction mapping.

It should be understood that processing the value interval of the third variable in the fifth loop statement is equivalent to expanding the value interval of the third variable. When the second program further includes other loop statements that need to be processed, value intervals of variables included in loop conditions in the other loop statements may be sequentially updated with reference to the manner of updating the value interval of the third variable in the fifth loop statement. After a value interval included in a loop condition of a last loop statement that needs to be processed is updated, the compilation result of the second program is obtained. In other words, the compilation result of the second program is related to the sixth loop statement.

In addition, in this embodiment of this application, the loop statements that need to be processed may be sequentially expanded from the outermost loop statement to the innermost loop statement or from the innermost loop statement to the outermost loop statement. The outermost loop statement is a layer of loop statement at the top of the second program, and the innermost loop statement is a layer of loop statement at the bottom of the second program.

In addition, in this embodiment of this application, value intervals of variables in loop conditions of all loop statements that need to be processed may be updated in any order.

With respect to technical effects, when the third variable is a value in the updated first value interval, the second conditional statement is always true. In this case, the second conditional statement in the fifth loop statement may be eliminated, so that a quantity of instructions obtained through mapping may be reduced in a subsequent process of mapping the compilation result of the second program (multi-dimensional data obtained after partition), and instruction transmission efficiency in the mapping process is improved. In addition, in a conventional technology, a loop condition of the third variable is fully expanded (that is, the value interval of the third variable is expanded by using 1 as a unit), to eliminate the conditional statement. In this embodiment of this application, the value interval of the third variable is updated as a whole, so that the second conditional statement is always true. This can effectively reduce a code length in the sixth loop statement obtained after updating, and reduce a code length in a program compilation result obtained based on the sixth loop statement. Further, mapping duration of a subsequent program compilation result is reduced, and running performance of the program compilation result is improved.

In an implementation, the second program includes an instruction mapping label; and the third variable is one of variables included in both the at least one conditional statement and loop conditions of loop statements following the instruction mapping label.

With respect to technical effects, only value intervals of the variables included in both the at least one conditional statement and the loop conditions of the loop statements following the instruction mapping label are updated, instead of updating value intervals of variables included in both the at least one conditional statement and loop conditions of the plurality of layers of loop statements. This can reduce a quantity of loop statements to be processed, reduce a code length in the compilation result, and obtain short mapping duration of the compilation result of the second program.

In an implementation, the updating a first value interval of the third variable in the fifth loop statement includes: obtaining a second value interval of the third variable based on the second conditional statement; and updating the first value interval by using an intersection set of the first value interval and the second value interval.

With respect to technical effects, the second value interval that makes the inequality always true may be obtained based on the second conditional statement. Therefore, after the first value interval is updated by using the intersection set of the first value interval and the second value interval, the obtained updated first value interval may make the second conditional statement in the fifth loop statement always true. In this case, the second conditional statement can be eliminated without the need to fully expand the fifth loop statement, so that the code length in the sixth loop statement obtained after updating can be effectively reduced, and running performance of the program compilation result is improved. Further, a quantity of instructions obtained by mapping the compilation result of the second program can be further reduced, thereby improving instruction transmission efficiency.

In an implementation, at least one of two endpoints of the value interval of the variable included in the loop condition of each layer of loop statement is a non-constant number, and/or each of the at least one conditional statement further includes a fourth variable, where the fourth variable is a variable that is not included in the loop condition of each layer of loop statement.

Each conditional statement includes at most one variable whose value interval needs to be updated.

With respect to technical effects, because at least one of the two endpoints of the value interval of the variable included in the loop condition of each layer of loop statement is a non-constant number, and/or each conditional statement further includes the fourth variable, where the fourth variable is a variable that is not included in the loop condition of each layer of loop statement. Therefore, at least one of two endpoints of the first value interval and at least one of two endpoints of the second value interval are non-constant numbers. Because each conditional statement includes only one variable that needs to be processed, upper and lower endpoints of the first value interval and the second value interval may be directly compared to obtain the updated first value interval, and other variables that need to be processed are not affected. When the fifth variable is a value in the updated first value interval, the second conditional statement is always true. Therefore, in a compilation process in this application, the conditional statement may be eliminated, and the first value interval does not need to be expanded. Therefore, not only a quantity of instructions obtained through mapping can be reduced, but also a code length in the subsequently obtained compilation result of the second program can be reduced. This reduces mapping duration of the subsequent compilation result of the second program.

According to a third aspect, this application provides a program compilation apparatus, and the apparatus includes: an obtaining unit, configured to obtain a first program, where the first program includes a plurality of layers of loop statements, a loop condition of each layer of loop statement in the plurality of layers of loop statements includes a variable and a value interval of the variable, and a loop body of the plurality of layers of loop statements includes at least one conditional statement; where the plurality of layers of loop statements include a first loop statement, where the first loop statement is a layer of loop statement in the plurality of layers of loop statements, a variable included in a loop condition of the first loop statement is a first variable, and the first variable is one of variables included in a first conditional statement in the at least one conditional statement; a processing unit, configured to process a value interval of the first variable in the first loop statement to obtain at least one loop statement corresponding to the first loop statement, where the at least one loop statement includes a second loop statement, both the first loop statement and the second loop statement include the first variable, a value interval of the first variable in the second loop statement is a first interval, the first interval is a subset of the value interval of the first variable in the first loop statement, and the first interval makes the first conditional statement always true; and a compilation unit, configured to compile the first program based on the at least one loop statement, to obtain a compilation result of the first program, where the compilation result of the first program is related to the at least one loop statement.

In an implementation, the first program includes an instruction mapping label; and when an estimated mapping time of the compilation result of the first program is greater than a preset time, the first variable is one of variables included in both the at least one conditional statement and loop conditions of loop statements following the instruction mapping label, and the estimated mapping time is a time required for mapping the compilation result of the first program to an executable instruction on hardware; or when the estimated mapping time of the compilation result of the first program is less than or equal to the preset time, the first variable is one of variables included in both the at least one conditional statement and loop conditions of all of the plurality of layers of loop statements.

In an implementation, the estimated mapping time of the compilation result of the first program is determined based on one or more of a quantity of variables included in the at least one conditional statement, a quantity of layers of the plurality of layers of loop statements, fuzzy intervals of the variables included in the at least one conditional statement, or a quantity of conditional statements. When a value of the variable is a value in a fuzzy interval of the variable, whether a conditional statement including the variable is true is further related to another factor.

In an implementation, the at least one loop statement corresponding to the first loop statement further includes a third loop statement. A value interval of the first variable in the third loop statement is a second interval, and when a value of the first variable is a value in the second interval, whether the first conditional statement is true is further related to another factor.

In an implementation, the first conditional statement further includes a second variable. The processing unit is further configured to: when the estimated mapping time of the compilation result of the first program is greater than the preset time, and the second variable is one of the variables included in both the at least one conditional statement and the loop conditions of the loop statements following the instruction mapping label; or when the estimated mapping time of the compilation result of the first program is less than or equal to the preset time, and the second variable is one of the variables included in both the at least one conditional statement and the loop conditions of all of the plurality of layers of loop statements, process the second interval of the first variable in the third loop statement to obtain one or more fourth loop statements. A value interval of the first variable in each of the fourth loop statements is a subset of the second interval.

In an implementation, the first conditional statement further includes a second variable, and a value interval of the second variable in the third loop statement is a third interval. The processing unit is further configured to: when the estimated mapping time of the compilation result of the first program is greater than the preset time, and the second variable is a variable included in a loop condition of a loop statement above the instruction mapping label, process the third interval in the third loop statement to obtain one or more fifth loop statements, where a value interval of the second variable in each of the fifth loop statements is a subset of the third interval.

In an implementation, two endpoints of the value interval of the variable included in the loop condition of each layer of loop statement are constants, and the variables included in the at least one conditional statement are variables included in loop conditions of the plurality of layers of loop statements.

According to a fourth aspect, this application provides a program compilation apparatus. The apparatus includes: an obtaining unit, configured to obtain a second program, where the second program includes a plurality of layers of loop statements, a loop condition of each layer of loop statement includes a variable and a value interval of the variable, and a loop body of the plurality of layers of loop statements includes at least one conditional statement; and the plurality of layers of loop statements include a fifth loop statement, where the fifth loop statement is a layer of loop statement in the plurality of layers of loop statements, a variable included in a loop condition of the fifth loop statement is a third variable, and the third variable is one of variables included in a second conditional statement in the at least one conditional statement; an updating unit, configured to update a first value interval of the third variable in the fifth loop statement to obtain a sixth loop statement, where the updated first value interval makes the second conditional statement always true; and a compilation unit, configured to compile the second program based on the sixth loop statement, to obtain a compilation result of the second program, where the compilation result of the second program is related to the sixth loop statement.

In an implementation, the second program includes an instruction mapping label; and the third variable is one of variables included in both the at least one conditional statement and loop conditions of loop statements following the instruction mapping label.

In an implementation, in terms of updating a first value interval of the third variable in the fifth loop statement, the updating unit is configured to: obtain a second value interval of the third variable based on the second conditional statement; and update the first value interval by using an intersection set of the first value interval and the second value interval.

In an implementation, at least one of two endpoints of the value interval of the variable included in the loop condition of each layer of loop statement is a non-constant number, and/or each of the at least one conditional statement further includes a fourth variable, where the fourth variable is a variable that is not included in the loop condition of each layer of loop statement.

According to a fifth aspect, this application provides a chip system. The chip system includes at least one processor, a memory, and an interface circuit. The memory, the interface circuit, and the at least one processor are interconnected through a line. The at least one memory stores instructions. When the instructions are executed by the processor, the method according to any one of the first aspect and/or the second aspect is implemented.

According to a sixth aspect, this application provides a compilation apparatus. The compilation apparatus includes the chip system according to the fifth aspect, and a discrete device coupled to the chip system.

According to a seventh aspect, this application provides a computer-readable storage medium. The computer-readable medium stores program code to be executed by a device. The program code is used to perform the method according to any one of the first aspect and/or the second aspect.

According to an eighth aspect, this application provides a computer program product. The computer program product includes program instructions. When the program instructions are run on a computer, the method according to any one of the first aspect and/or the second aspect is implemented.

BRIEF DESCRIPTION OF DRAWINGS

The following describes the accompanying drawings used in embodiments of this application.

FIG. 5 is a flowchart of a program compilation method according to an embodiment of this application;

FIG. 6 is a flowchart of another program compilation method according to an embodiment of this application;

DESCRIPTION OF EMBODIMENTS

The following describes embodiments of this application with reference to the accompanying drawings in embodiments of this application.

Technical solutions in embodiments of this application may be applied to various computer systems, including a personal computer (PC), a computer cluster system, a mainframe computer system, various supercomputers, or the like. This is not limited in this application. In addition, this application may be further applied to various compilers, for example, a GNU compiler collection (GCC) and a low level virtual machine (LLVM). This is not limited in embodiments of this application either.

First, related terms in embodiments of this application are explained.

(1) Tensorize: refers to a process in which a program representing multi-dimensional data is mapped into an instruction.

(2) Tail block: When multi-dimensional data cannot be exactly partitioned in a dimension during partition, a remaining part in this case is referred to as a tail block. The multi-dimensional data may be a matrix.

(3) Compilation: refers to a process of transforming one form of source code into another form of source code. Compilation in this application refers to a process of processing a source program that represents multi-dimensional data, to obtain a program that represents multi-dimensional data obtained after partition.

(4) Instruction mapping label: An instruction mapping label is a label, and may be //pragma_emit_insn="vmuls", where pragma_emit_insn is a keyword of the instruction mapping label, that is, indicates that the label is an instruction mapping label, and vmuls represents a type, and represents a multiplication of vectors herein. The instruction mapping label is used to indicate that code following the label is mapped to an instruction, and the instruction is subsequently processed into an instruction that can be executed on hardware (for example, a CPU). In addition, in a mapping process, code following the instruction mapping label can only be a determined program execution process, that is, cannot include a branch jump (for example, a conditional statement).

Figures 1, 2:
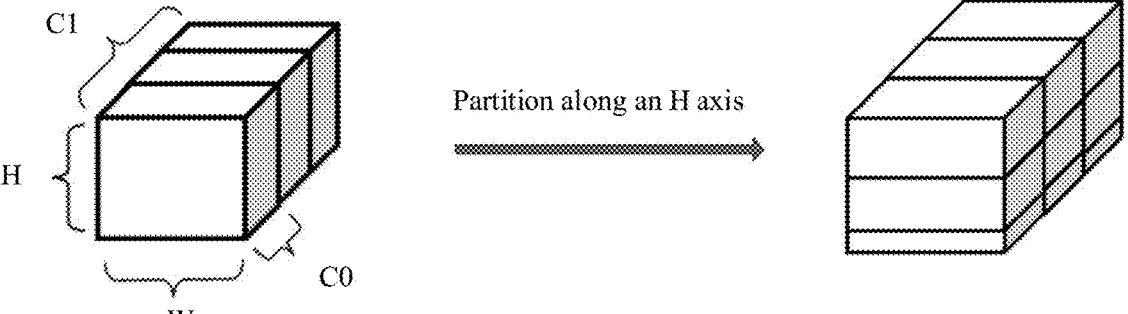
FIG. 1 is a diagram of program representation of multi-dimensional data according to an embodiment of this application.
FIG. 2 is a diagram of a process of partitioning multi-dimensional data according to an embodiment of this application.

FIG. 1 is a diagram of a program representation of multi-dimensional data according to an embodiment of this application. The multi-dimensional data may be a matrix. As shown in FIG. 1, the nine lines of program code represent one piece of multi-dimensional data, the program includes five layers of nested for loop statements, and each layer of loop statement corresponds to one dimension of the multi-dimensional data. The first line, the second line, and the fourth to the sixth lines are loop conditions of the five layers of loop statements respectively, and the seventh line is a conditional statement in a loop body. From top to bottom, for the first layer (that is, the outermost layer) of loop statement, a loop condition is the first line of code, a loop body is the second to ninth lines of code, and the seventh line of code is the conditional statement in the loop body. For the second layer of loop statement, a loop condition is the second line of code, and a loop body is the third to ninth lines of code. The third line of code is an instruction mapping label in the multi-dimensional data. The label indicates that code following the label is to be mapped to an instruction in a subsequent process of mapping the multi-dimensional data. However, in a process in which the multi-dimensional data is irregularly partitioned, the program includes a conditional statement (the seventh line of code). Therefore, in a subsequent process of mapping the multi-dimensional data, the instruction mapping label is moved to a following line of the conditional statement, so that a program execution process included in a following line of the instruction mapping label is a determined process. As a result, a large quantity of instructions are obtained through mapping, which is far greater than nine instructions obtained in regular partition, and instruction transmission efficiency during SIMD is severely affected.

FIG. 2 is a diagram of a process of partitioning multi-dimensional data according to an embodiment of this application. The process of partitioning multi-dimensional data corresponds to a compilation process of a first program or a second program in embodiments of this application. A program shown in FIG. 1 represents the multi-dimensional data in FIG. 2. In FIG. 2, the multi-dimensional data also includes five dimensions: C1, W, C0, and H (including H_o and H_i, represented as H in FIG. 2).

In actual application, due to a limitation of a hardware memory, large data usually cannot be evenly partitioned into blocks. For example, when the multi-dimensional data shown in FIG. 2 is partitioned along an H direction, data in the H direction is partitioned into three blocks. The first two blocks of data have a same size in the H direction, and a size of a third block of data in the H direction is not equal to the size of the first two blocks of data in the H direction.

The multi-dimensional data shown in FIG. 2 is partitioned into nine blocks. Theoretically, it is expected that the multi-dimensional data is mapped into nine instructions, and the nine instructions are used to complete an operation on the entire multi-dimensional data. However, due to irregular partition, a quantity of instructions finally obtained through mapping is far greater than nine, which seriously affects instruction transmission efficiency.

However, in a conventional technology, when multi-dimensional data is irregularly partitioned, a plurality of layers of nested loops in a program that represents the multi-dimensional data are fully expanded, to eliminate a conditional statement. However, this manner greatly increases a code length in a program compilation result, and increases mapping duration of the compilation result.

The following describes a system architecture and an application scenario of embodiments of this application.

Figure 3:
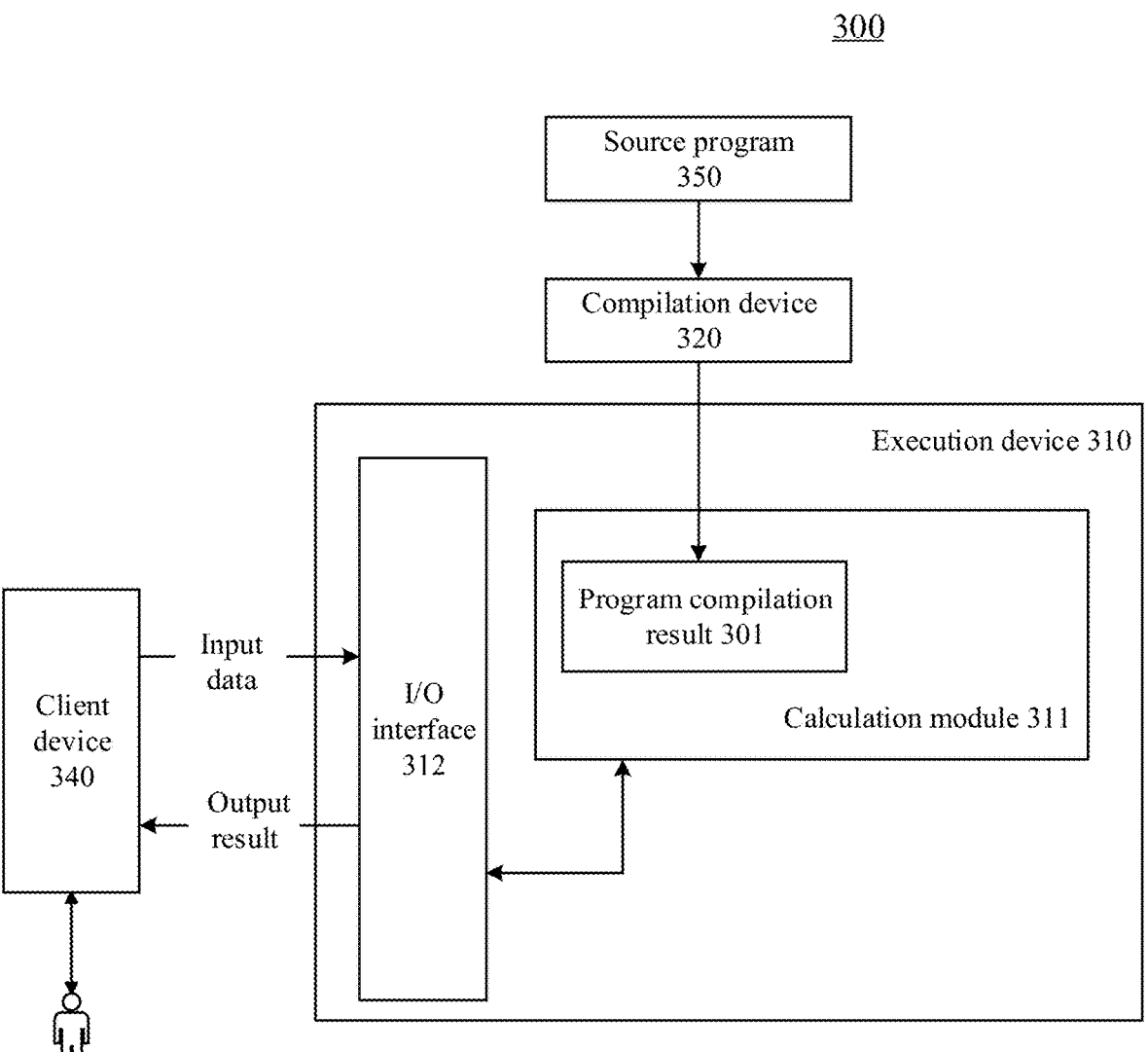
FIG. 3 is a diagram of a system architecture according to an embodiment of this application.

FIG. 3 is a diagram of a system architecture 300 according to an embodiment of this application.

As shown in FIG. 3, a compilation device 320 compiles a source program 350 to obtain a program compilation result 301. The source program 350 is a program (a first program or a second program) in embodiments of this application, and may be a program for a multi-dimensional data operation in different scenarios. The different scenarios include image processing, voice recognition, scientific computing, physical modeling, or the like. The compilation device 320 may be any device that includes a compiler (such as a GCC or an LLVM).

The following describes in detail, based on embodiments shown in FIG. 5 and FIG. 6, a process in which the compilation device 320 compiles the source program 350.

The program compilation result 301 obtained through compilation by using the compilation device 320 may be applied to different systems or devices, for example, applied to an execution device 310 shown in FIG. 3. The execution device 310 may be a terminal, for example, a mobile phone terminal, a tablet computer, a notebook computer, augmented reality (AR)/virtual reality (VR) terminal, or a vehicle-mounted terminal, or may be a server, a cloud, or the like. In FIG. 3, the execution device 310 is configured with an input/output (I/O) interface 312 for data exchange with an external device.

The execution device 310 may receive data input by a database 330 or a client device 340, and execute a related calculation process in the program compilation result 301 through a calculation module 311, to obtain a corresponding processing result.

Finally, the I/O interface 312 returns a processing result (for example, an image processing result or a speech recognition result) to the client device 340 for providing the processing result to the user.

It should be noted that the compilation device 320 may compile source programs that are used to implement different targets or different tasks, to obtain corresponding program compilation results 301, and then execute related calculation processes in the program compilation results 301 through the execution device 310, to obtain processing results for the different targets or different tasks.

In a case shown in FIG. 3, the user may manually provide input data and such manual operation may be performed in an interface provided by the I/O interface 312. In another case, the client device 340 may automatically send input data to the I/O interface 312. If the client device 340 needs to obtain authorization from the user to automatically send the input data, the user may set a corresponding permission in the client device 340. The user may view, on the client device 340, a result output by the execution device 310. The result may be presented in a form of displaying a sound, an action, or the like.

It should be noted that FIG. 3 is a diagram of a system architecture according to an embodiment. A location relationship between a device, a component, a module, and the like shown in the figure constitutes no limitation. For example, in FIG. 3, the compilation device 320 is an external device relative to the execution device 310. In another case, the compilation device 320 may alternatively be disposed in the execution device 310. The execution device 310 is an external device relative to the client device 340. In another case, the execution device 310 and the client device 340 may be a same device.

Figure 4:
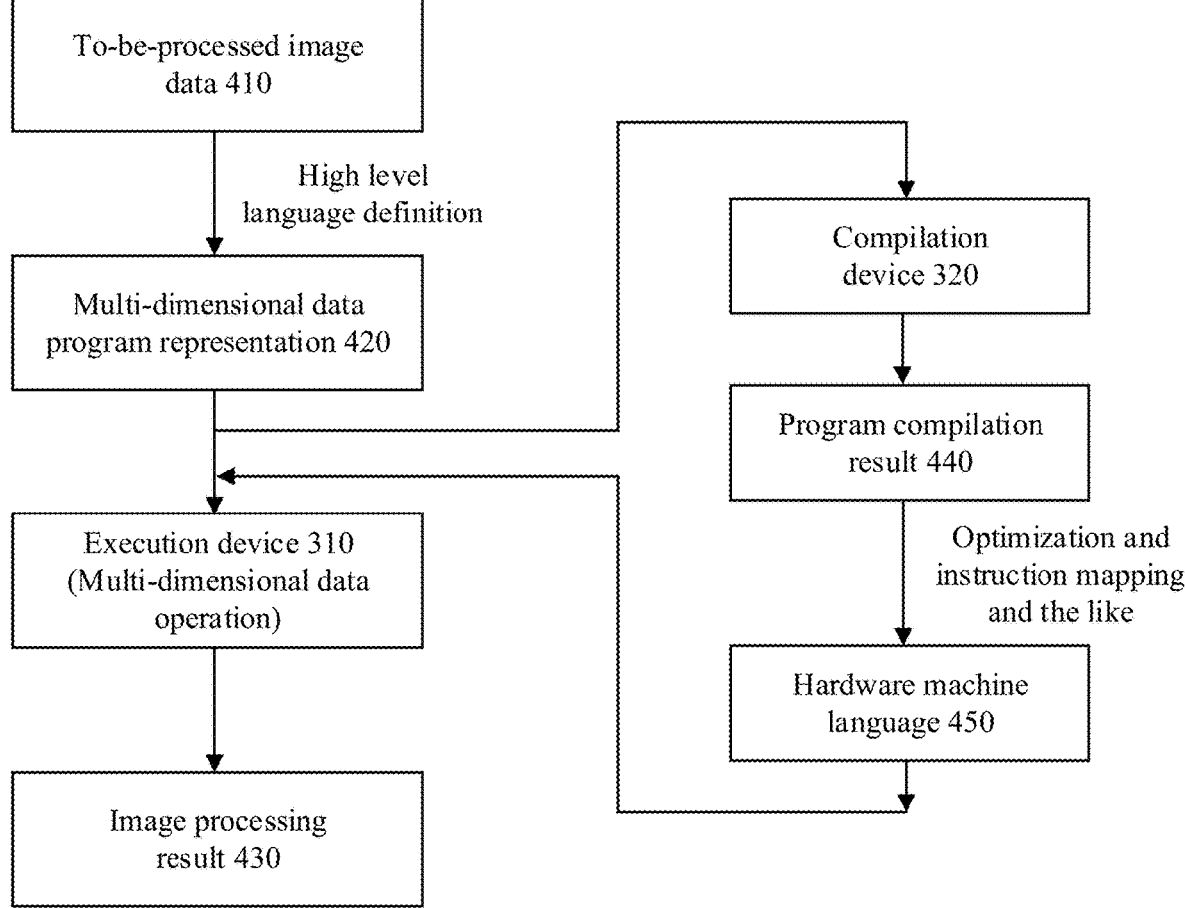
FIG. 4 is a diagram of an application scenario according to an embodiment of this application.

FIG. 4 is a diagram of an application scenario according to an embodiment of this application. It should be understood that a compilation method 500 and a compilation method 600 (see FIGS. 5 and 6) in embodiments of this application may be applied to a scenario in which a multi-dimensional data operation needs to be performed in a field of artificial intelligence (such as image processing or voice recognition), scientific computing, physical modeling, or the like. FIG. 4 describes application processes of the compilation method 500 and the compilation method 600 in embodiments of this application by using a deep learning-based image processing scenario (for example, image recognition, target detection, and image partition) in the field of artificial intelligence as an example.

First, to-be-processed image data 410 is obtained, and a high-level language (for example, C, C++, Python, or another programming language) is used to define the to-be-processed image data 410, to obtain multi-dimensional data program representation 420 (namely, the source program in FIG. 3) corresponding to the to-be-processed image data 410.

The compilation device 320 performs the compilation method 500 and/or the compilation method 600 in embodiments of this application to compile the multi-dimensional data program representation 420 (namely, a first program or a second program in the following embodiment), to obtain a program compilation result 440 (namely, the program compilation result 301 in FIG. 3). Operations such as optimization and instruction mapping are performed on the program compilation result 440 to obtain a hardware machine language 450 executable on hardware (for example, a CPU or a GPU).

The execution device 310 runs the hardware machine language 450 to perform a corresponding multi-dimensional data operation, to obtain an image processing result 430 (for example, a processing result in image recognition is a category label of an image, a processing result in target detection is a target recognized from an image, and a processing result in image partition is a partition result of an image).

It should be understood that, in FIG. 4, the compilation device 320 is an external device relative to the execution device 310. In another case, the compilation device 320 may alternatively be disposed in the execution device 310.

FIG. 5 is a flowchart of a program compilation method according to an embodiment of this application. The method 500 includes steps S510, S520, S530, and S540. The method 500 is applied to a static scenario.

Step S510: Obtain a first program, where the first program includes a plurality of layers of loop statements, a loop condition of each layer of loop statement in the plurality of layers of loop statements includes a variable and a value interval of the variable, and a loop body of the plurality of layers of loop statements includes at least one conditional statement.

Step S520: The plurality of layers of loop statements include a first loop statement, where the first loop statement is a layer of loop statement in the plurality of layers of loop statements, a variable included in a loop condition of the first loop statement is a first variable, and the first variable is one of variables included in a first conditional statement in the at least one conditional statement.

Step S530: Process a value interval of the first variable in the first loop statement to obtain at least one loop statement corresponding to the first loop statement, where the at least one loop statement includes a second loop statement, both the first loop statement and the second loop statement include the first variable, a value interval of the first variable in the second loop statement is a first interval, the first interval is a subset of the value interval of the first variable in the first loop statement, and the first interval makes the first conditional statement always true.

Step S540: Compile the first program based on the at least one loop statement to obtain a compilation result of the first program, where the compilation result of the first program is related to the at least one loop statement.

The first program including the plurality of layers of loop statements may be used to represent multi-dimensional data. The compilation result of the first program may correspondingly be program representation of partitioned multi-dimensional data.

The first interval is obtained based on the first loop statement and the value interval of the first variable in the first conditional statement.

The compilation result of the first program is a program representation in a high-level language (C, C++, python, or the like). The compilation result of the first program can only be converted into an executable instruction on hardware (for example, a CPU or a GPU) after subsequent processing such as instruction mapping.

It should be understood that processing the value interval of the first variable in the first loop statement is equivalent to expanding the value interval of the first variable. When the first program further includes other loop statements that need to be processed, value intervals of variables included in loop conditions in the other loop statements may be sequentially expanded with reference to the manner of expanding the value interval of the first variable in the first loop statement. After a last loop statement that needs to be processed is expanded, the compilation result of the first program is obtained. In other words, the compilation result of the first program is related to the at least one loop statement.

The loop statement may be a for loop statement.

The following uses the program in FIG. 1 as an example to describe a structure of a program used to represent multi-dimensional data in the static scenario. In FIG. 1, the program used to represent multi-dimensional data includes five layers of nested for loop statements, each layer of loop statement includes one loop condition, and loop conditions of the five layers of loop statements are respectively the first to second lines and the fourth to sixth lines of code in FIG. 1. The loop condition of each layer of loop statement includes one variable and a value interval of the one variable. For example, a variable in a control part of the first layer of loop statement is C1, and a value interval of C1 is (0,3), which may indicate that a value of C1 is one of three values: 0, 1, and 2.

In addition, as shown in FIG. 1, a range of a loop statement at the topmost layer (that is, the outermost layer) is the first to ninth lines of code; and a range of a loop statement at the bottommost layer (the innermost layer) is the sixth to ninth lines of code. The first loop statement may be a layer of loop statement in the plurality of layers of loop statements.

In an implementation, the first program includes an instruction mapping label. When an estimated mapping time of the compilation result of the first program is greater than a preset time, the first variable is one of variables included in both the at least one conditional statement and loop conditions of loop statements following the instruction mapping label. The estimated mapping time is a time required for mapping the compilation result of the first program to an executable instruction on hardware. When the estimated mapping time of the compilation result of the first program is less than or equal to the preset time, the first variable is one of the variables included in both the at least one conditional statement and loop conditions of all of the plurality of layers of loop statements.

Each first program that represents multi-dimensional data includes one instruction mapping label.

It is determined, based on the estimated mapping time of the compilation result of the first program, that the plurality of layers of loop statements are expanded in a full partition manner or a partial partition manner, that is, variables to be processed (value interval expansion) in different partition manners are determined.

(1) Full Partition

When the estimated mapping time of the compilation result of the first program is greater than the preset time, the full partition manner is used to ensure that a conditional statement in the first program is eliminated to a maximum extent, so as to reduce a quantity of instructions obtained by mapping the compilation result and improve instruction transmission efficiency. In this manner, a variable whose value interval needs to be expanded is a variable included in both the at least one conditional statement and the loop condition of the loop statement following the instruction mapping label. For example, if the full partition manner is used, variables whose value intervals need to be expanded in FIG. 1 are H_o and H_i.

(2) Partial Partition

When the estimated mapping time of the compilation result of the first program is less than or equal to the preset time, the partial partition manner is used to ensure that a code length in the compilation result is reduced to a maximum extent, so as to reduce the mapping time of the compilation result in a mapping process. In this manner, a variable whose value interval needs to be expanded is a variable included in both the at least one conditional statement and the loop conditions of all of the plurality of layers of loop statements. For example, if the full partition manner is used, a variable whose value interval needs to be expanded in FIG. 1 is H_i.

The first variable in the first loop statement is a variable whose value interval needs to be expanded, and the preset time may be a time set based on a scenario. This is not limited in this application.

With respect to technical effects, when the estimated mapping time of the compilation result of the first program is greater than the preset time, to control a mapping duration of the compilation result, in this case, only value intervals of the variables included in both the at least one conditional statement and the loop conditions of the loop statements following the instruction mapping label are sequentially processed. In this way, a quantity of processed loop statements is reduced, the code length in the compilation result is reduced, and the mapping duration of the compilation result of the program is reduced. In addition, when the estimated mapping time of the compilation result of the first program is less than or equal to the preset time, value intervals of all the variables included in both the at least one conditional statement and the loop conditions of all of the plurality of layers of loop statements may be sequentially processed. In this case, the conditional statement in the first program may be eliminated to the greatest extent, so that a quantity of instructions obtained by mapping the compilation result of the first program is reduced, that is, high-performance instructions are obtained.

In an implementation, the estimated mapping time of the compilation result of the first program is determined based on one or more of a quantity of variables included in the at least one conditional statement, a quantity of layers of the plurality of layers of loop statements, fuzzy intervals of the variables included in the at least one conditional statement, or a quantity of conditional statements. When a value of the variable is a value in a fuzzy interval of the variable, whether a conditional statement including the variable is true is further related to another factor.

The estimated mapping time of the compilation result of the first program is in direct proportion to the code length in the compilation result.

The another factor refers to another variable in the conditional statement. In other words, whether the conditional statement including the variable is true is jointly determined by the variable and the another variable in the conditional statement including the variable.

The code length in the compilation result (namely, a program obtained after the first program that represents the multi-dimensional data is expanded) may be calculated by using the quantity of variables included in the at least one conditional statement in the plurality of layers of loop statements, the quantity of layers of the plurality of layers of loop statements, the fuzzy intervals of the variables included in the at least one conditional statement in the plurality of layers of loop statements, or the quantity of conditional statements in the plurality of layers of loop statements. Then, the estimated mapping time of the compilation result of the first program is calculated based on the code length in the compilation result. A calculation manner is not limited in this application.

With respect to technical effects, the code length in the compilation result of the first program may be obtained through calculation using the quantity of variables in the at least one conditional statement, the quantity of layers of the plurality of layers of loop statements, the fuzzy intervals of the variables, and the quantity of conditional statements in the at least one conditional statement. Therefore, accurate mapping duration may be obtained through calculation based on the foregoing parameters, and a quantity of variables that need to be processed is determined (that is, a layer of loop statement at which the variable is located is correspondingly determined) based on the mapping duration. In this way, instruction transmission efficiency and the mapping duration of the compilation result of the first program are ensured, that is, instruction transmission efficiency is high and the mapping duration is short for the compilation result of the first program.

In an implementation, the at least one loop statement corresponding to the first loop statement further includes a third loop statement. A value interval of the first variable in the third loop statement is a second interval, and when a value of the first variable is a value in the second interval, whether the first conditional statement is true is further related to another factor.

The processing the value interval of the first variable in the first loop statement includes: decomposing the value interval of the first variable included in the loop condition in the first loop statement, where intervals obtained after decomposition include the first interval, the second interval, and a fourth interval. When the value of the first variable is a value in the first interval, the first conditional statement is always true. When the value of the first variable is a value in the second interval, the first conditional statement is true or false. In other words, in this case, whether the first conditional statement is true is jointly determined by the second interval of the first variable and another part in a first conditional equation. The second interval may also be referred to as a fuzzy interval of the first variable. When the value of the first variable is a value in the fourth interval, the first conditional statement is always not true. Therefore, the fourth interval may be directly eliminated. Then the value interval of the first variable in the first loop statement is expanded based on the first interval, the second interval, and the fourth interval to obtain the second loop statement and the third loop statement.

A value range of the first variable in the second loop statement is the first interval. In addition, because the first conditional statement in the second loop statement is always true, the second loop statement may not include the first conditional statement. A value interval of the first variable in the third loop statement is the second interval. Whether the first conditional statement in the third loop statement is true is jointly determined by the second interval of the first variable and another part in the first conditional equation. Therefore, the third loop statement includes the first conditional statement.

It should be understood that the foregoing process of processing the value interval of the first variable in the first loop statement is a process of expanding the value interval of the first variable in the first loop statement, that is, a process of expanding the first loop statement.

The another factor refers to another variable in the first conditional statement. In other words, whether the first conditional statement including the first variable is true is jointly determined by the first variable and the another variable in the first conditional statement.

The third loop statement is obtained with the second loop statement after the first loop statement is expanded. The first interval and the second interval are subsets of the value interval of the first variable in the first loop statement. The second interval is a fuzzy interval of the first variable.

In views of technical effects, because the first conditional statement in the second loop statement is always true, and whether the first conditional statement in the third loop statement is true is jointly determined by the first variable and another variable in the first conditional statement, the first loop statement is expanded into the second loop statement and the third loop statement for differentiation, to eliminate the first conditional statement in the second loop statement. In addition, when the first conditional statement further includes another variable, the third loop statement may be subsequently further expanded to eliminate the first conditional statement.

In an implementation, the first conditional statement further includes a second variable. The method further includes: when the estimated mapping time of the compilation result of the first program is greater than the preset time, and the second variable is one of the variables included in both the at least one conditional statement and the loop conditions of the loop statements following the instruction mapping label; or when the estimated mapping time of the compilation result of the first program is less than or equal to the preset time, and the second variable is one of the variables included in both the at least one conditional statement and the loop conditions of all of the plurality of layers of loop statements, processing the second interval of the first variable in the third loop statement to obtain one or more fourth loop statements, where a value interval of the first variable in each of the fourth loop statements is a subset of the second interval.

In an implementation, the first conditional statement further includes a second variable, and a value interval of the second variable in the third loop statement is a third interval. The method further includes: when the estimated mapping time of the compilation result of the first program is greater than the preset time, and the second variable is a variable included in a loop condition of a loop statement above the instruction mapping label, processing the third interval in the third loop statement to obtain one or more fifth loop statements, where a value interval of the second variable in each of the fifth loop statements is a subset of the third interval.

It should be understood that an objective of expanding the first loop statement (which is also referred to as expanding the value interval of the first variable in the first loop statement) is to eliminate the first conditional statement, including the first variable.

To eliminate the first conditional statement in the third loop statement, the third loop statement may be further expanded. Expansion of the third loop statement includes two cases:

(1) The another variable included in the first conditional statement is a variable whose value interval needs to be expanded.

In addition to the first variable, the first conditional statement further includes a second variable whose value interval needs to be expanded. In this case, because the value interval of the first variable also needs to be subsequently expanded, the value range of the first variable in the third loop statement is the second interval (a fuzzy interval). In this case, the second interval may be decomposed (the second interval is decomposed by using 1 as a unit). Then, the third loop statement is further expanded based on a value of the first variable after decomposition, so that when the value interval of the second variable is subsequently expanded, the first conditional statement may be eliminated based on the determined value of the first variable.

After the third loop statement is expanded, a value of the first variable in each obtained fourth loop statement is a fixed value, and each fourth loop statement still includes the first conditional statement. A value interval of the first variable in each fourth loop statement is a subset of the second interval.

It should be understood that, in addition to the first variable, the first conditional statement may further include a plurality of variables whose value intervals need to be expanded. In this case, the plurality of variables whose value intervals need to be expanded may be used as a whole, and the third loop statement is expanded with reference to a case in which the first conditional statement includes the second variable. Details are not described herein again.

(2) The another variable included in the first conditional statement is not a variable whose value interval needs to be expanded.

Because the second variable is not a variable whose value interval needs to be expanded, the value interval of the second variable in the third loop statement, namely, the third interval, may be decomposed by using 1 as a unit. In addition, a value of the corresponding first variable is determined based on each fixed value of the second variable obtained after decomposition, to eliminate the first conditional statement. Finally, the third loop statement is expanded based on a combination of each fixed value of the first variable And the value of the corresponding first variable to obtain one or more fifth loop statements so that the first conditional statement in each fifth loop statement is always true, to eliminate the first conditional statement in each fifth loop statement.

A value interval of the first variable in each fifth loop statement is a subset of the second interval.

It should be understood that, in addition to the first variable, the first conditional statement may include a plurality of variables, and none of the plurality of variables is a variable whose value interval needs to be expanded. In this case, the plurality of variables may be used as a whole (namely, the second variable), and the third loop statement is expanded with reference to the expansion process in case (2). Details are not described herein again.

With respect to technical effects, whether the first conditional statement in the third loop statement is true is jointly determined by values of the first variable and the second variable. Therefore, a second interval corresponding to the value of the first variable may be first expanded, and a value of the second variable in each fourth loop statement is correspondingly determined, so that the first conditional statement in each fourth loop statement is always true, to eliminate the first conditional statement in each fourth loop statement. This further reduces instructions generated during compilation result mapping, improves instruction transmission efficiency, and therefore obtains a high-performance program compilation result.

In addition, whether the first conditional statement in the third loop statement is true is jointly determined by the values of the first variable and the second variable. Therefore, a value interval (the third interval) corresponding to the second variable in the third loop statement may be expanded, and a value of the first variable in each fifth loop statement is determined, so that the first conditional statement in each fifth loop statement is always true, to eliminate the first conditional statement in each fifth loop statement. This further reduces instructions generated during subsequent compilation result mapping, and improves instruction transmission efficiency.

In an implementation, two endpoints of the value interval of the variable included in the loop condition of each layer of loop statement are constants, and the variables included in the at least one conditional statement are variables included in loop conditions of the plurality of layers of loop statements.

The method 500 may be applied to a static scenario: A value interval of a variable included in the loop condition of each layer of loop statement is a constant interval, and the variables included in the at least one conditional statement are variables included in the loop conditions of the plurality of layers of loop statements.

Therefore, in the static scenario, the foregoing determined first interval, second interval, fourth interval, and third interval are all constant intervals (values of two endpoints of the interval are determined integers). Then, the first loop statement may be expanded and the third loop statement may be expanded to eliminate the first conditional statement, so as to reduce a quantity of instructions obtained by mapping the compilation result.

It should be understood that the first loop statement is only a loop statement at any one layer in the plurality of layers of loop statements that needs to be expanded. In other words, the foregoing method 500 describes a processing process of the loop statement at any one layer that needs to be expanded. In a process of compiling the first program that represents the multi-dimensional data, for an expansion manner of another loop statement that needs to be expanded, refer to the expansion process of the first loop statement. Details are not described herein again.

In addition, in this embodiment of this application, the loop statements that need to be processed may be sequentially expanded from the outermost loop statement to the innermost loop statement or from the innermost loop statement to the outermost loop statement. The outermost loop statement is a layer of loop statement at the top of the first program, and the innermost loop statement is a layer of loop statement at the bottom of the first program.

With respect to technical effects, in the method embodiment 500, when the first variable is a value in the first interval, the first conditional statement may always be true, and the value interval of the first variable in the second loop statement is the first interval. Therefore, the first conditional statement in the second loop statement may be eliminated and the quantity of instructions obtained through mapping may be reduced in a process of mapping the compilation result of the first program (multi-dimensional data obtained after partition). This improves instruction transmission efficiency in the mapping process and enhances running performance of the compilation result of the first program. In addition, in a conventional technology, a value interval of the first variable is fully expanded (that is, the value interval of the first variable is expanded by using 1 as a unit) to eliminate the first conditional statement. In this application, because the first conditional statement is always true when the first variable is a value in the first interval, the value interval of the first variable in the first loop statement may be expanded in a form of an interval. Therefore, a code length of the second loop statement obtained after expansion can be effectively reduced, that is, the code length in the compilation result of the first program is reduced, thereby reducing the mapping duration of the subsequent compilation result of the first program.

The following describes, with Table 1 and Table 2 as examples, a process in the static scenario in which the first program that represents multi-dimensional data is compiled in the foregoing two different partition manners. Program representation of the multi-dimensional data for which the two manners in Table 1 and Table 2 are used is shown in the following:

---

Program 1:

---

```
for (A, 0, 9) {   line 1
//instruction mapping label   line 2
    for (B, 0, 6) {   line 3
        if (A + B < 10){   line 4
            body[A] = body[B]   line 5
}}}   line 6
```

---

Program 1 includes two layers of nested for loop statements. In the first layer of loop statement (the first to sixth lines of code), a loop condition is the first line of code; a loop body is the second to sixth lines of code; a variable included in the loop condition is A, a value interval of A is [0,8], which takes nine values from 0 to 8; and a conditional statement included in the loop body is A+B<10. In the second layer of loop statement (the third to sixth lines of code), a loop condition is the third line of code; a loop body is the third to sixth lines of code; a variable included in the loop condition is B; and a value interval of B is [0,5], which takes six values from 0 to 5. In addition, because the value intervals of the variable A and the variable B are constant intervals, and variables in the conditional statement are all variables included in the loop condition, it can be learned that program 1 is a program in the static scenario.

Refer to Table 1. Table 1 shows a process of compiling program 1 in the full partition manner. In this case, variables whose value intervals need to be expanded are variables included in both all conditional statements in the plurality of layers of loop statements and loop conditions of all of the plurality of layers of loop statements, that is, variables A and B.

In Table 1, two layers of loop statements are sequentially expanded from the outermost layer to the innermost layer. In this case, the variable A is the first variable, the variable B is the second variable, and the conditional statement A+B<10 is the first conditional statement.

First, the first loop statement (that is, the first layer of loop statement) is expanded. The first interval (a constant true interval), the second interval (a fuzzy interval), and the fourth interval (a constant false interval) of the first variable A are calculated, which are [0,4], [5,9], and [10,+∞] respectively. The first loop statement is expanded based on the first interval and the second interval without using the fourth interval to obtain the second loop statement and the third loop statement.

For details, refer to the first column in Table 1. The first to fourth lines of code is the second loop statement, and the fifth to ninth lines of code is the third loop statement. Because a value interval (a constant true interval) of the first variable A in the second loop statement makes the first conditional statement A+B<10 always true, the first conditional statement in the second loop statement may be eliminated. A value interval of the first variable A in the third loop statement is the second interval (a fuzzy interval). In this case, whether the first conditional statement is true is jointly determined by a value of the first variable A and a value of the second variable B. As a result, the first conditional statement cannot be eliminated. The first interval [0,4] is represented by (A, 0, 5) in the first line of code, and the second interval [5,9] is represented by (A, 0, 4) in the fifth line of code.

Because the second variable B included in the first conditional statement is also a variable whose value interval needs to be expanded, to facilitate subsequent expansion of a value interval of the second variable B, the second interval [5,9] further needs to be decomposed by using 1 as a unit. Then, the third loop statement is further expanded based on a fixed value of the first variable A obtained after decomposition, to obtain four fourth loop statements.

For details, refer to the second column in Table 1. The four fourth loop statements from top to bottom are: the sixth to eleventh lines of code, the twelfth to seventeenth lines of code, the eighteenth to twenty-third lines of code, and the twenty-fourth to twenty-ninth lines of code, respectively. Values of first variables in the four fourth loop statements from top to bottom are 5, 6, 7, and 8 respectively.

In conclusion, the second column in Table 1 is the second loop statement and the four fourth loop statements that are obtained after the first loop statement is expanded.

Next, the value interval of the second variable B is expanded. A loop statement including the second variable B includes the second loop statement and the four fourth loop statements. For the second loop statement, because the first conditional statement in the second loop statement has been eliminated, the second variable B in the second loop statement does not need to be partitioned, that is, the second loop statement does not need to be expanded. For each fourth loop statement, because the first conditional statement includes only two variables, and a value of the first variable A is a fixed value, a first interval (a constant true interval) and a fourth interval (a constant false interval) of the second variable B may be calculated. First intervals corresponding to the second variable B in the four fourth loop statements from top to bottom are [0,4], [0,3], [0,2], and [0,1] respectively. Then, each fourth loop statement is expanded based on the first interval corresponding to the second variable B, to obtain a program shown in the third column in Table 1, that is, a compilation result of program 1.

As shown in the third column in Table 1, the first conditional statement in each expanded fourth loop statement is eliminated.

TABLE 1

| Compilation process of the full partition manner in the static scenario | | |
|---|---|---|
| Partition of the variable A: expand the first loop statement | Partition of the variable A: expand the third loop statement | Partition of the variable B: expand the fourth loop statement |
| 1    for (A, 0, 5){ | 1    for (A, 0, 5){ | for (A, 0, 5){ |

TABLE 1-continued

| Compilation process of the full partition manner in the static scenario | | |
|---|---|---|
| 2    //instruction mapping label | 2    //instruction mapping label | //instruction mapping label |
| 2        for(B, 0, 6){ | 3        for(B, 0, 6){ |     for(B, 0, 6){ |
| 3            body[A] = body[B] | 4            body[A] = body[B] |         body[A] = body[B] |
| 4        }} | 5        }} |     }} |
| 5    for(A, 0, 4){ //An actual value of A is 5 | 6    for(A, 0, 1){ //An actual value of A is 5 | for(A, 0, 1){ //An actual value of A is 5 |
| 6        //instruction mapping label | 7        //instruction mapping label | //instruction mapping label |
|          for(B, 0, 6){ | 8        for(B, 0, 6){ |     for(B, 0, 5){ |
| 7            if(A + B < 10){ | 9            if(A + B < 10){ |         body[A+5] = body[B] |
| 8                body[A+5] = body[B] | 10               body[A+5] = body[B] |     }} |
| 9        }}} | 11       }}} | for(A, 0, 1){ //An actual value of A is 6 |
|  | 12   for(A, 0, 1){ //An actual value of A is 6 | //instruction mapping label |
|  | 13       //instruction mapping label |     for(B, 0, 4){ |
|  | 14       for(B, 0, 6){ |         body[A+6] = body[B] |
|  | 15           if(A + B < 10){ |     }} |
|  | 16               body[A+6] = body[B] | for(A, 0, 1){ //An actual value of A is 7 |
|  | 17       }}} | //instruction mapping label |
|  | 18   for(A, 0, 1){ //An actual value of A is 7 |     for(B, 0, 3){ |
|  | 19       //instruction mapping label |         body[A+7] = body[B] |
|  | 20       for(B, 0, 6){ |     }} |
|  | 21           if(A + B < 10){ | for(A, 0, 1){ //An actual value of A is 8 |
|  | 22               body[A+7] = body[B] | //instruction mapping label |
|  | 23       }}} |     for(B, 0, 2){ |
|  | 24   for(A, 0, 1){ //An actual value of A is 8 |         body[A+8] = body[B] |
|  | 25       //instruction mapping label |     }} |
|  | 26       for(B, 0, 6){ |  |
|  | 27           if(A + B < 10){ |  |
|  | 28               body[A+8] = body[B] |  |
|  | 30       }}} |  |

35

TABLE 2

| Compilation process of the partial partition manner in the static scenario | |
|---|---|
| Partition of the variable B: expand the first loop statement | Partition of the variable B: expand the third loop statement |
| 1    for (A, 0, 9){ | 1    for (A, 0, 9){ |
| 2        if(A < 5){//Constant true interval | 2        if(A < 5){ |
| 3            //instruction mapping label | 3            //instruction mapping label |
| 4            for(B, 0, 6){ | 4            for(B, 0, 6){ |
| 5                body[A] = body[B] | 5                body[A] = body[B] |
| 6            } | 6            } |
| 7        } else if (A < 9){ //fuzzy interval | 7        } else if (A < 6){ |
| 8            //instruction mapping label | 8            //instruction mapping label |
| 9            for(B, 0, 6){ | 9            for(B, 0, 5){ |
| 10               if(A + B < 10){ | 10               body[A] = body[B] |
| 11                   body[A] = body[B] | 11           } |
| 12               } | 12       } else if (A < 7){ |
| 13       }}} | 13           //instruction mapping label |
|  | 14           for(B, 0, 4){ |
|  | 15               body[A] = body[B] |
|  | 16           } |
|  | 17       } else if (A < 8){ |
|  | 18           //instruction mapping label |
|  | 19           for(B, 0, 3){ |
|  | 20               body[A] = body[B] |
|  | 21           } |
|  | 22       } else if (A < 9){ |
|  | 23           //instruction mapping label |
|  | 24           for(B, 0, 2){ |
|  | 25               body[A] = body[B] |
|  | 26           } |
|  | 27       }}} |

Refer to Table 2. Table 2 shows a process of compiling program 1 in the partial partition manner. In this case, a variable whose value interval needs to be expanded is a variable, included in both a loop condition of a loop statement following the instruction mapping label and all conditional statements in the plurality of layers of loop statements, that is, the variable B.

The first variable is a variable whose value interval needs to be expanded, that is, the variable B, and the second variable is a variable whose value interval does not need to be expanded, that is, the variable A.

First, the first loop statement (namely, the second layer of loop statement in the plurality of layers of loop statements) is expanded. Because the first variable A is located at an outer layer of the second variable B, a value interval of the first variable A is first decomposed. When value intervals of the first variable A are [0,4], [5,9], and [10,+∞] respectively, regardless of a value of the second variable B, determining results of the first conditional statement are: always true, true or false, and always false, respectively. Therefore, a first interval (a constant true interval), a second interval (a fuzzy interval), and a fourth interval (a constant false interval) of the second variable B are all [0,5]. The first loop statement is expanded based on a combination of a value interval of the second variable B and a value interval of the first variable A without using the fourth interval, to obtain the second loop statement and the third loop statement.

For details, refer to the first column in Table 2. The second to sixth lines of code is the second loop statement, and the seventh to twelfth lines of code is the third loop statement. Because a combination of values of the second variable B and the first variable A in the second loop statement makes the first conditional statement A+B<10 always true, the first conditional statement in the second loop statement may be eliminated. In the third loop statement, whether the first conditional statement is true is jointly determined by the values of the second variable B and the first variable A. Therefore, the first conditional statement cannot be eliminated. The first interval [0,5] is represented by (B, 0, 6) in the fourth line of code, and the second interval [0,5] is represented by (B, 0, 6) in the ninth line of code.

Further, to eliminate the first conditional statement in the third loop statement, a value interval (namely, the third interval) of the first variable A in the third loop statement may be decomposed by using 1 as a unit. Then, the third loop statement is further expanded based on a fixed value of the first variable A obtained after decomposition, to obtain four fifth loop statements.

Refer to the second column in Table 2. The four fifth loop statements from top to bottom are: the seventh to eleventh lines of code, the twelfth to sixteenth lines of code, the seventeenth to twenty-first lines of code, and the twenty-second to twenty-sixth lines of code, respectively. Values of second variables A in the four fifth loop statements from top to bottom are 5, 6, 7, and 8 respectively, and value intervals of the corresponding second variable B are [0,4], [0,3], [0,2], and [0,1] respectively. As shown in the second column in Table 2, the first conditional statement in each expanded fifth loop statement is eliminated.

In conclusion, the second column in Table 2 is the second loop statement and the four fifth loop statements that are obtained after the first loop statement is expanded, that is, a compilation result of program 1.

The following describes, by using examples in Table 3 and Table 4, differences in code lengths in compilation results obtained through compilation in the full partition manner and the partial partition manner and corresponding quantities of instructions obtained through subsequent mapping.

As shown in Table 3, the first column is program representation of multi-dimensional data, and the second column is a program compilation result obtained through the full partition manner. Codes in the third line, the seventh line, the eleventh line, and the fifteenth line in the second column indicate that the third to thirteenth lines of code in the first column are included therein. Therefore, a code length in the program compilation result obtained through the full partition manner is extended by about four times that in an original program. The third column is a program compilation result obtained through the partial partition manner. A variable outer2 is partitioned, a branch condition is eliminated in a layer, and a code length in the program compilation result is extended by about one to two times that in the original program.

TABLE 3

Comparison of code lengths in compilation results in different compilation modes

| Program representation of multi-dimensional data | Full partition manner: | Partial partition manner: |
|---|---|---|
| 1  for (outer1,0,2){ | 1  for (outer1,0,1){ // An actual value of outer1 is 0 | for (outer1,0,2){ |
| 2    for(outer2,0,2){ | 2    for(outer2,0,1){ // An actual value of outer2 is 0 | for(outer2,0,2){ |
| 3      //body_all starts | 3      body_all | if(condition1') |
| 4      // attr = "dma_copy" | 4    }} | // attr = "dma_copy" |
| 5        if(condition1) | 5  for (outer1,0,1){ // An actual value of outer1 is 0 | body1' |
| 6          body1 | 6      for(outer2,0,1){ //An actual value of outer2 is 1 | if(condition2') |
| 7      // attr = "dma_copy" | 7        body_all | // attr = "dma_copy" |
| 8        if(condition2) | 8    }} | body2' |
| 9          body2 | 9  for (outer1,0,1){ // An actual value of outer1 is 1 | if(condition3') |
| 10     // attr = "dma_copy" | 10       for(outer2,0,1){ //An actual value of outer2 is 0 | // attr = "dma_copy" |
| 11       if(condition3) | 11        body_all | body3' |
| 12         body3 | 12     }} | } |
| 13     //body_all ends | 13   for (outer1,0,1){ // An actual value of outer1 is 1 | } |
| 14   } | 14       for(outer2,0,1){ //An actual value of outer2 is 1 | |
| 15 } | | |

TABLE 3-continued

| Comparison of code lengths in compilation results in different compilation modes | |
| --- | --- |
| 15 | body_all |
| 16 | } |
| 17 | } |

Table 4 describes comparison results of quantities of instructions obtained by mapping compilation results in different compilation modes. The first column in Table 4 is program representation of multi-dimensional data. Each time data represented by the program is processed, an instruction mapping label needs to be moved to a following line of an if conditional statement. In this case, 4608 instructions are obtained through mapping, that is, the instructions are actually run for 4608 times. The second column is a program compilation result obtained through the full partition manner, and nine instructions are obtained by mapping the compilation result. When the first layer of loop statement and the second layer of loop statement are combined, six instructions are obtained through mapping; and when the first layer of loop statement and the third layer of loop statement are combined, three instructions are obtained through mapping. Similarly, a compilation result obtained through the partial partition manner in the third column of Table 4 is also mapped to nine instructions. Compared with the original instruction mapping, the foregoing two compilation modes can improve instruction transmission efficiency by 512 (4608/9) times.

It should be noted that, as the partial partition manner is an incomplete partition manner, some if conditional statements still exist in the compilation result, which affects instruction transmission efficiency to some extent. Therefore, the full partition manner may be used when the mapping duration is not affected, to obtain instructions with higher performance.

Step S610: Obtain a second program, where the second program includes a plurality of layers of loop statements, a loop condition of each layer of loop statement includes a variable and a value interval of the variable, and a loop body of the plurality of layers of loop statements includes at least one conditional statement.

Step S620: The plurality of layers of loop statements include a fifth loop statement, where the fifth loop statement is a layer of loop statement in the plurality of layers of loop statements, a variable included in a loop condition of the fifth loop statement is a third variable, and the third variable is one of variables included in a second conditional statement in the at least one conditional statement.

Step S630: Update a first value interval of the third variable in the fifth loop statement to obtain a sixth loop statement, where the updated first value interval makes the second conditional statement always true.

Step S640: Compile the second program based on the sixth loop statement, to obtain a compilation result of the second program, where the compilation result of the second program is related to the sixth loop statement.

The second program including the plurality of layers of loop statements may be used to represent multi-dimensional data. The compilation result of the second program may correspondingly be program representation of partitioned multi-dimensional data.

The compilation result of the second program is program representation in a high-level language (C, C++, python, or

TABLE 4

| Comparison of quantities of instructions obtained by mapping compilation results in different compilation modes | | |
| --- | --- | --- |
| Program representation of multi-dimensional data | Full partition manner: | Partial partition manner: |
| for (x0, 0, 3) { | 1   for (x0, 0, 3) { | for (x0, 0, 3) { |
| for (x1, 0, 3) { | 2      //three times of processing | //three times of processing |
| //pragma_emit_insn = | in a C1 direction | in the C1 direction |
| "vmuls" | 3   for (x1, 0, 2) { | for (x1,0, 3) { |
| vmuls_intrinsic( ); | 4      //two times of processing | // at most two times of |
| for (x2, 0, 5) { | in a x1 direction | processing in the x1 direction |
| for (x3, 0, 8) { | 5      // pragma_emit_insn = | if (x1*5 < 8){ |
| for (x4, 0, 16) { | "vmuls" | // pragma_emit_insn = |
| if((((x1*5) + x2) < | 6      vmuls_intrinsic( ); | "vmuls" |
| 12)) { | 7      //processing of a main | vmuls_intrinsic( ); |
| }}}}} | block | //processing of a main |
| } | 8        } | block |
| | 9   for (x1', 0, 1) { | }} |
| | 10       //one time of processing | if (x1*5 >= 8){ |
| | in the x1 direction | //at most one time of |
| | 11      // pragma_emit_insn = | processing in the x1 direction |
| | "vmuls" | // pragma_emit_insn = |
| | 12          vmuls_intrinsic( ); | "vmuls" |
| | 13  //processing of a tail block | vmuls_intrinsic( ); |
| | 14        }} | //processing of a tail |
| | | block |
| | | }}} |

FIG. 6 is a flowchart of another program compilation method according to an embodiment of this application. The method 600 includes steps S610, S620, S630, and S640. The method 600 is applied to a dynamic scenario.

the like). The compilation result of the second program can only be converted into an executable instruction on hardware (for example, a CPU or a GPU) after subsequent processing such as instruction mapping.

It should be understood that processing the value interval of the third variable in the fifth loop statement is equivalent to expanding the value interval of the third variable. When the second program further includes other loop statements that need to be processed, value intervals of variables included in loop conditions in the other loop statements may be sequentially updated with reference to the manner of updating the value interval of the third variable in the fifth loop statement. After a value interval included in a loop condition of a last loop statement that needs to be processed is updated, the compilation result of the second program is obtained. In other words, the compilation result of the second program is related to the sixth loop statement.

In addition, in this embodiment of this application, the loop statements that need to be processed may be sequentially expanded from the outermost loop statement to the innermost loop statement or from the innermost loop statement to the outermost loop statement. The outermost loop statement is a layer of loop statement at the top of the first program, and the innermost loop statement is a layer of loop statement at the bottom of the first program.

The following uses a program in the first column of Table 5 as an example to describe a structure of a program used to represent multi-dimensional data in the dynamic scenario. In Table 5, the program used to represent multi-dimensional data includes two layers of nested for loop statements, each layer of loop statement includes one loop condition, and loop conditions of the two layers of loop statements are respectively the first line of code and the third line of code in the first column of Table 5. The loop condition of each layer of loop statement includes one variable and a value interval of the one variable. For example, a variable in a loop condition of the first layer of loop statement is A, and a value interval of A is [0,8]. In the first line of code, the value interval is represented as (A, 0, 9), which may indicate that a value of A is one of nine values from 0 to 9.

Optionally, the loop statement may be a for loop statement.

In addition, as shown in the first column of Table 5, a range of a loop statement at the topmost layer (that is, the outermost layer) is the first to sixth lines of code; and a range of a loop statement at the bottommost layer (the innermost layer) is the third to sixth lines of code. The first loop statement may be a layer of loop statement in the plurality of layers of loop statements.

In an implementation, the second program includes an instruction mapping label; and the third variable is one of variables included in both the at least one conditional statement and loop conditions of loop statements following the instruction mapping label.

Each second program that represents multi-dimensional data includes one instruction mapping label.

In the dynamic scenario, a variable whose value interval needs to be updated is a variable included in both a conditional statement in the plurality of layers of loop statements and the loop condition of the loop statement following the instruction mapping label. The third variable is a variable whose value interval needs to be updated. For example, in the first column of Table 5, a variable whose value interval needs to be updated is a variable B.

With respect to technical effects, only value intervals of the variables included in both the at least one conditional statement and the loop conditions of the loop statements following the instruction mapping label are updated, instead of updating value intervals of variables included in both the at least one conditional statement and loop conditions of the plurality of layers of loop statements. This can reduce a quantity of loop statements to be processed, reduce a code length in the compilation result, and obtain short mapping duration of the compilation result of the second program.

In an implementation, the updating a first value interval of the third variable in the fifth loop statement includes: obtaining a second value interval of the third variable based on the second conditional statement; and updating the first value interval by using an intersection set of the first value interval and the second value interval.

An item in the second conditional statement is transposed to obtain the second value interval of the third variable, and then an intersection set of the second value interval and the first value interval is calculated. In the dynamic scenario, at least one of two endpoints of the second value interval and at least one of two endpoints of the first value interval are non-constant numbers. Therefore, values of the two endpoints of the second value interval and values of the two endpoints of the first value interval need to be compared. Left and right endpoints of the second value interval are a first endpoint and a second endpoint respectively, and left and right endpoints of the first value interval are a third endpoint and a fourth endpoint, respectively. Left and right endpoints on of the updated first value interval are a fifth endpoint and a sixth endpoint, respectively. The intersection set of the first value interval and the second value interval may be calculated according to formula (1).

$$\text{Fifth endpoint} = \max(\text{first endpoint, third endpoint}) \tag{1}$$

$$\text{Sixth endpoint} = \min(\text{second endpoint, fourth endpoint})$$

It is indicated in formula (1) that a maximum value of the first endpoint and the third endpoint is used as the fifth endpoint, and a minimum value of the second endpoint and the fourth endpoint is used as the sixth endpoint.

When the intersection set of the first value interval and the second value interval is used to update the first value interval, formula (1) is updated to a previous line of the instruction mapping label in the program, to eliminate the second conditional statement.

Further, because formula (1) is located in the previous line of the instruction mapping label, formula (1) may be further expanded by using an if condition expression, to obtain the sixth loop statement.

Optionally, formula (1) may be further expanded, and the obtained sixth loop statement includes four conditional branches:

(1) if (the first endpoint is greater than the second endpoint, and the third endpoint is greater than the fourth endpoint), the updated first value interval is [first endpoint, fourth endpoint].

(2) if (the first endpoint is greater than the second endpoint, and the third endpoint is less than or equal to the fourth endpoint), the updated first value interval is [first endpoint, third endpoint].

(3) if (the first endpoint is less than or equal to the second endpoint, and the third endpoint is less than or equal to the fourth endpoint), the updated first value interval is [second endpoint, third endpoint].

(4) if (the first endpoint is less than or equal to the second endpoint, and the third endpoint is greater than the fourth endpoint), the updated first value interval is [second endpoint, fourth endpoint].

With respect to technical effects, the second value interval that makes the inequality always true may be obtained based on the second conditional statement. Therefore, after the first value interval is updated by using the intersection set of the first value interval and the second value interval, the obtained updated first value interval may make the second conditional statement in the fifth loop statement always true. In this case, the second conditional statement can be eliminated without the need to fully expand the fifth loop statement, so that a code length in the sixth loop statement obtained after updating can be effectively reduced, and running performance of the program compilation result is improved. Further, a quantity of instructions obtained by mapping the compilation result of the second program can be further reduced, thereby improving instruction transmission efficiency.

In an implementation, at least one of two endpoints of a value interval of a variable included in the loop condition of each layer of loop statement is a non-constant number, and/or each of the at least one conditional statement further includes a fourth variable, where the fourth variable is a variable that is not included in the loop condition of each layer of loop statement.

Each conditional statement includes at most one variable whose value interval needs to be updated.

A dynamic scenario to which the method 600 is applied is as follows: at least one of two endpoints of a value interval of a variable included in the loop condition is a non-constant number, and/or each conditional statement further includes a fourth variable, and each conditional statement includes at most one variable whose value interval needs to be updated. Therefore, in the foregoing dynamic scenario, at least one of the two endpoints of the second value interval and at least one of the two endpoints of the first value interval are non-constant numbers. Therefore, the foregoing formula (1) and the updated first value interval may be used to eliminate the second conditional statement. In addition, because the two endpoints of the second value interval and the two endpoints of the first value interval do not include a variable whose value interval needs to be updated, formula (1) may be updated to a previous line of the instruction mapping label. Subsequently, formula (1) may be further expanded by using the conditional statement to update the fifth loop statement, so as to obtain the sixth loop statement. In addition, because formula (1) is in the previous line of the instruction mapping label, after formula (1) is expanded, the quantity of instructions generated by mapping the program compilation result is not increased.

It should be understood that the fifth loop statement is merely any one layer of loop statement, in the plurality of layers of loop statements, in which a value interval in a loop condition needs to be updated. In other words, the foregoing method 600 describes a processing process of any one layer of loop statement in which a value interval in a loop condition needs to be updated. In the dynamic scenario, in a process of compiling the program that represents multi-dimensional data, for a manner of processing another loop statement in which a value interval in a loop condition needs to be updated, refer to the processing process of the fifth loop statement. Details are not described herein again. After all loop statements that are in the second program and in which value intervals in loop conditions need to be updated are processed, the compilation result of the second program is obtained. Therefore, the compilation result of the second program is related to the sixth loop statement.

In addition, in the dynamic scenario, value intervals of variables in the loop conditions of all of the loop statements that need to be processed may be updated in any order in this embodiment of this application.

With respect to technical effects, in the foregoing method embodiment 600, when the third variable is a value in the updated first value interval, the second conditional statement is always true. In this case, the second conditional statement in the fifth loop statement may be eliminated, so that a quantity of instructions obtained through mapping may be reduced in a subsequent process of mapping the compilation result of the second program (multi-dimensional data obtained after partition), and instruction transmission efficiency in the mapping process is improved. In addition, in a conventional technology, a loop condition of the third variable is fully expanded (that is, the value interval of the first variable is expanded by using 1 as a unit), to eliminate the conditional statement. In this embodiment of this application, the value interval of the third variable is updated as a whole, so that the second conditional statement is always true. This can effectively reduce a code length in the sixth loop statement obtained after updating, and reduce a code length in a program compilation result obtained based on the sixth loop statement. Further, a mapping duration of a subsequent program compilation result is reduced, and a running performance of the program compilation result is improved.

With reference to an example in Table 5, the following describes a compilation process of the second program in the dynamic scenario. As shown in the first column of Table 5, the first column is program representation of multi-dimensional data.

As shown in the first column of Table 5, the program includes two layers of nested for loop statements and a second conditional statement if (A+B<n), and the second line of code is an instruction mapping label. The second conditional statement includes a fourth variable n. In this case, a variable that whose value interval needs to be updated is a variable included in both all conditional statements in the plurality of layers of loop statements and a loop condition of a loop statement following the instruction mapping label, that is, a variable B.

In conclusion, the third to sixth lines of code in the program is the fifth loop statement in the method 600, and the variable B is the third variable in the method 600. A first value interval and a second value interval of the third variable B are [0,5] and [−∞,n−A] respectively.

Then, an intersection set of the first value interval and the second value interval is calculated. Because 0 is greater than −∞, in this case, only a value of a sixth endpoint B_ext of the updated first value interval needs to be calculated. The value of the sixth endpoint is a minimum value of 5 and (n−A), that is, B_ext=min(n−A, 5). In this case, the intersection set of the first value interval and the second value interval is [0,n−A]. The foregoing program is updated by using B_ext=min(n−A, 5) and [0,n−A] at the same time, to eliminate the second conditional statement and obtain program code shown in the second column of Table 5.

Finally, an if conditional statement is used to expand the second line of code in the second column of Table 5 to obtain the second to twelfth lines of code in the third column of Table 5, that is, the sixth loop statement.

TABLE 5

Program compilation process in the dynamic scenario

| Program representation of multi-dimensional data | Update the value interval of the third variable: | Synchronously update the fifth loop statement: |
|---|---|---|
| 1    for (A, 0, 9) { | 1    for (A, 0, 9) { | 1    for (A, 0, 9) { |
| 2        //pragma_emit_insn = "vmuls" | 2        let B_ext = min(n–A, 5) | 2        if(n–A<5){ |
| | 3        //pragma_emit_insn = "vmuls" | 3        let B_ext = n–A // processing of a tail block |
| 3        for (B, 0,6) { | 4            for (B, 0, B_ext) { | 4        //pragma_emit_insn = "vmuls" |
| 4            if(A+ B < n){ | 5                body[0] | 5            for (B, 0,B_ext) { |
| 5            body[0] | 6            }} | 6                body[0] |
| 6        }}} | | 7        }} else { |
| | | 8            let B_ext = 5 //processing of a main block |
| | | 9        //pragma_emit_insn = "vmuls" |
| | | 10            for (B, 0,B_ext) { |
| | | 11            body[0] |
| | | 12        }}} |

The following uses a program in Table 6 as an example to describe a quantity of instructions generated by mapping a compilation result of the program in a conventional technology and in this solution in a dynamic scenario. As shown in the first column of Table 6, the instruction mapping label is located in the third line of code. When a for loop statement is not expanded, a quantity of instructions obtained through mapping is 4608, that is, the instructions are actually run for 4608 times. According to this embodiment of this application, a quantity of instructions obtained by mapping the compilation result is 9. In Table 6, a combination of the first layer of loop statement and a conditional branch in the third line of code in the second column is mapped to obtain six instructions, and a combination of the first layer of loop statement and a conditional branch in the seventh line of code is mapped to obtain three instructions, that is, a total of nine instructions are obtained.

In other words, by using the method in this embodiment of this application, multi-dimensional data can be processed through nine times of instruction execution. Instruction transmission efficiency is improved by 512 (4608/9) times.

TABLE 6

Quantity of instructions generated by mapping the compilation result in the dynamic scenario

| Program representation of multi-dimensional data | Program compilation result in the dynamic scenario: |
|---|---|
| for (x0, 0, 3) { | for (x0, 0, 3) { |
|     for (x1, 0, 3) { |     for (x1,0, 3) { |
|         //pragma_emit_insn = "vmuls" |         if (n–x1*5<5){ |
|             vmuls_intrinsic( ); |             let x2_ext = n–x1*5 |
|         for (x2, 0, 5) { |             // pragma_emit_insn = "vmuls" |
|             for (x3, 0, 8) { |             vmuls_intrinsic( ); |
|                 for (x4, 0, 16) { |         }}else{ |
|                     if((((x1*5) + x2) < n)) { |     let x2_ext = 5 |
|                     }}}}} |             //pragma_emit_insn = "vmuls" |
|     } |             vmuls_intrinsic( ); |
| |         }}} |

Figure 7:
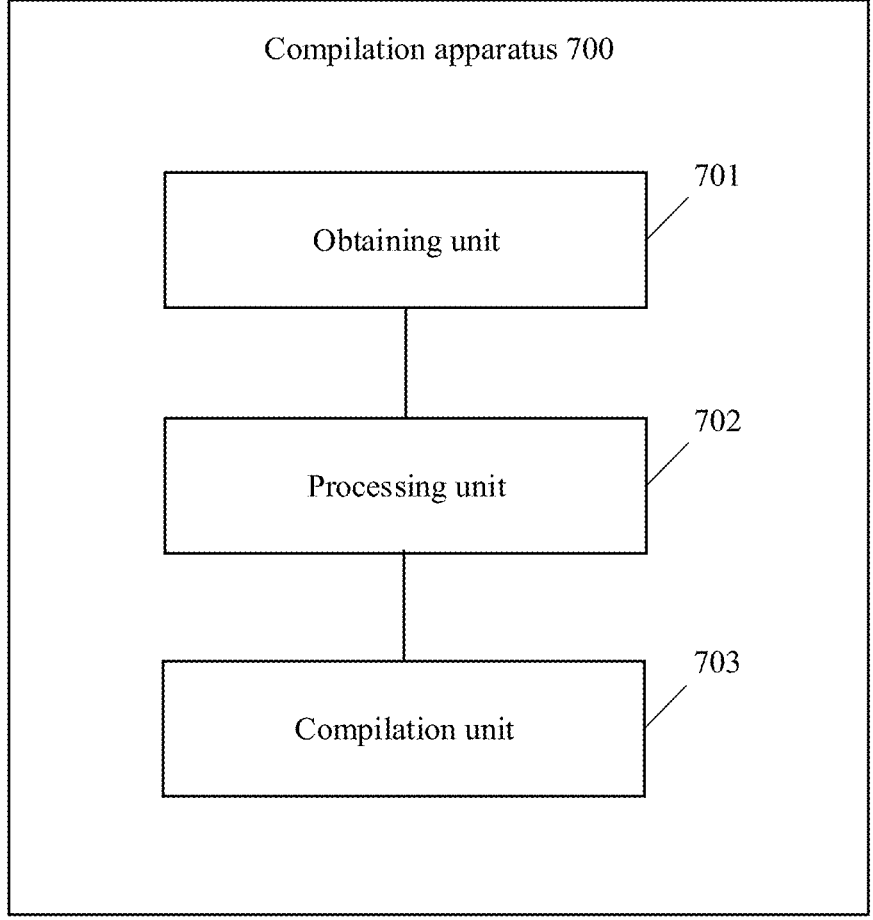
FIG. 7 is a diagram of a structure of a compilation apparatus according to an embodiment of this application.

FIG. 7 is a diagram of a structure of a compilation apparatus 700 according to an embodiment of this application. The apparatus 700 includes:

an obtaining unit 701 configured to obtain a first program, where the first program includes a plurality of layers of loop statements, a loop condition of each layer of loop statement in the plurality of layers of loop statements includes a variable and a value interval of the variable, and a loop body of the plurality of layers of loop statements includes at least one conditional statement; and the plurality of layers of loop statements include a first loop statement, where the first loop statement is a layer of loop statement in the plurality of layers of loop statements, a variable included in a loop condition of the first loop statement is a first variable, and the first variable is one of variables included in a first conditional statement in the at least one conditional statement;

a processing unit 702 configured to process a value interval of the first variable in the first loop statement to obtain at least one loop statement corresponding to the first loop statement, where the at least one loop statement includes a second loop statement, both the first loop statement and the second loop statement include the first variable, a value interval of the first variable in the second loop statement is a first interval, the first interval is a subset of the value interval of the first variable in the first loop statement, and the first interval makes the first conditional statement always true; and a compilation unit 703 configured to compile the first program based on the at least one loop statement to obtain a compilation result of the first program, where the compilation result of the first program is related to the at least one loop statement.

In an implementation, the first program includes an instruction mapping label; and when an estimated mapping time of the compilation result of the first program is greater than a preset time, the first variable is one of variables included in both the at least one conditional statement and loop conditions of loop statements following the instruction mapping label, and the estimated mapping time is a time required for mapping the compilation result of the first program to an executable instruction on hardware; or when the estimated mapping time of the compilation result of the first program is less than or equal to the preset time, the first variable is one of variables included in both the at least one conditional statement and loop conditions of all of the plurality of layers of loop statements.

In an implementation, the estimated mapping time of the compilation result of the first program is determined based on one or more of a quantity of variables included in the at least one conditional statement, a quantity of layers of the plurality of layers of loop statements, fuzzy intervals of the variables included in the at least one conditional statement, or a quantity of conditional statements. When a value of the variable is a value in a fuzzy interval of the variable, whether a conditional statement including the variable is true is further related to another factor.

In an implementation, the at least one loop statement corresponding to the first loop statement further includes a third loop statement. A value interval of the first variable in the third loop statement is a second interval, and when a value of the first variable is a value in the second interval, whether the first conditional statement is true is further related to another factor.

In an implementation, the first conditional statement further includes a second variable. The processing unit is further configured to: when the estimated mapping time of the compilation result of the first program is greater than the preset time and the second variable is one of the variables included in both the at least one conditional statement and the loop conditions of the loop statements following the instruction mapping label; or when the estimated mapping time of the compilation result of the first program is less than or equal to the preset time and the second variable is one of the variables included in both the at least one conditional statement and the loop conditions of all of the plurality of layers of loop statements, process the second interval of the first variable in the third loop statement to obtain one or more fourth loop statements, where a value interval of the first variable in each of the fourth loop statements is a subset of the second interval.

In an implementation, the first conditional statement further includes a second variable, and a value interval of the second variable in the third loop statement is a third interval. The processing unit is further configured to: when the estimated mapping time of the compilation result of the first program is greater than the preset time, and the second variable is a variable included in a loop condition of a loop statement above the instruction mapping label, process the third interval in the third loop statement to obtain one or more fifth loop statements, where a value interval of the second variable in each of the fifth loop statements is a subset of the third interval.

In an implementation, two endpoints of the value interval of the variable included in the loop condition of each layer of loop statement are constants, and the variables included in the at least one conditional statement are variables included in loop conditions of the plurality of layers of loop statements.

Figure 8:
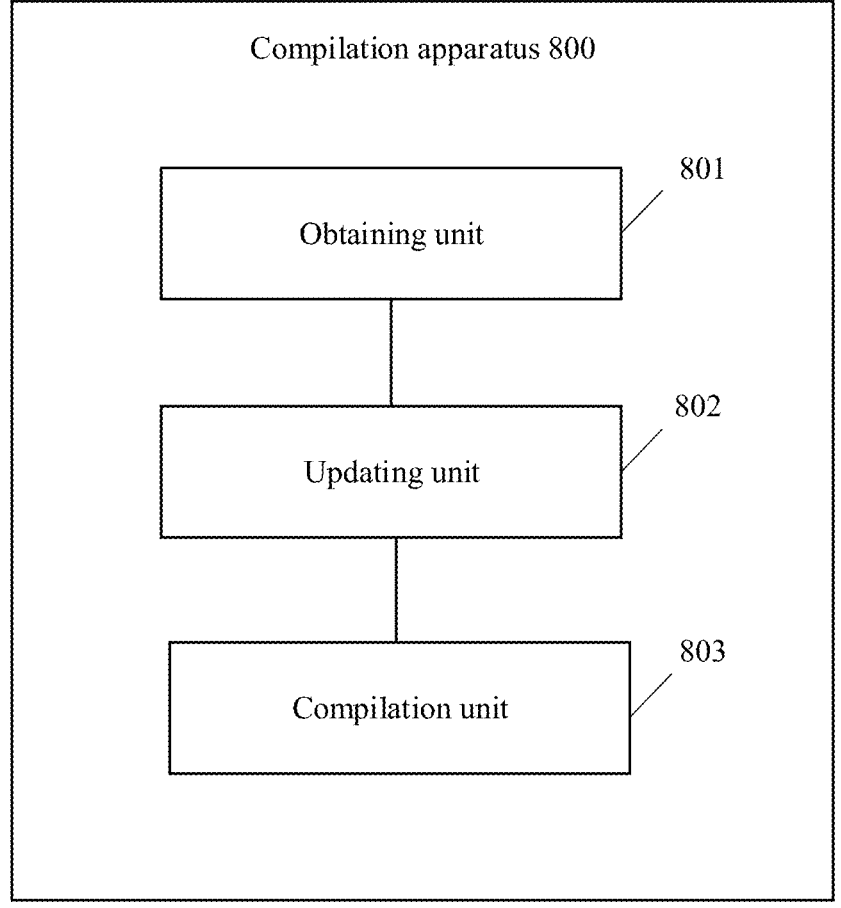
FIG. 8 is a diagram of a hardware structure of a compilation apparatus according to an embodiment of this application.

FIG. 8 is a diagram of a structure of a compilation apparatus 800 according to an embodiment of this application. The apparatus 800 includes:

an obtaining unit 801 configured to obtain a second program, where the second program includes a plurality of layers of loop statements, a loop condition of each layer of loop statement includes a variable and a value interval of the variable, and a loop body of the plurality of layers of loop statements includes at least one conditional statement; and the plurality of layers of loop statements include a fifth loop statement, where the fifth loop statement is a layer of loop statement in the plurality of layers of loop statements, a variable included in a loop condition of the fifth loop statement is a third variable, and the third variable is one of variables included in a second conditional statement in the at least one conditional statement;

an updating unit 802 configured to update a first value interval of the third variable in the fifth loop statement to obtain a sixth loop statement, where the updated first value interval makes the second conditional statement always true; and a compilation unit 803 configured to compile the second program based on the sixth loop statement to obtain a compilation result of the second program, where the compilation result of the second program is related to the sixth loop statement.

In an implementation, the second program includes an instruction mapping label; and the third variable is one of variables included in both the at least one conditional statement and loop conditions of loop statements following the instruction mapping label.

In an implementation, in terms of updating a first value interval of the third variable in the fifth loop statement, the updating unit is configured to: obtain a second value interval of the third variable based on the second conditional statement; and update the first value interval by using an intersection set of the first value interval and the second value interval.

In an implementation, at least one of two endpoints of a value interval of a variable included in the loop condition of each layer of loop statement is a non-constant number, and/or each of the at least one conditional statement further includes a fourth variable, where the fourth variable is a variable that is not included in the loop condition of each layer of loop statement.

It should be understood that the apparatus 700 and the apparatus 800 herein are presented in forms of functional units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 700 and the apparatus 800 may be configured to perform procedures and/or steps corresponding to a compiler in the foregoing method embodiments 500 and/or 600. To avoid repetition, details are not described herein again.

Figure 9:
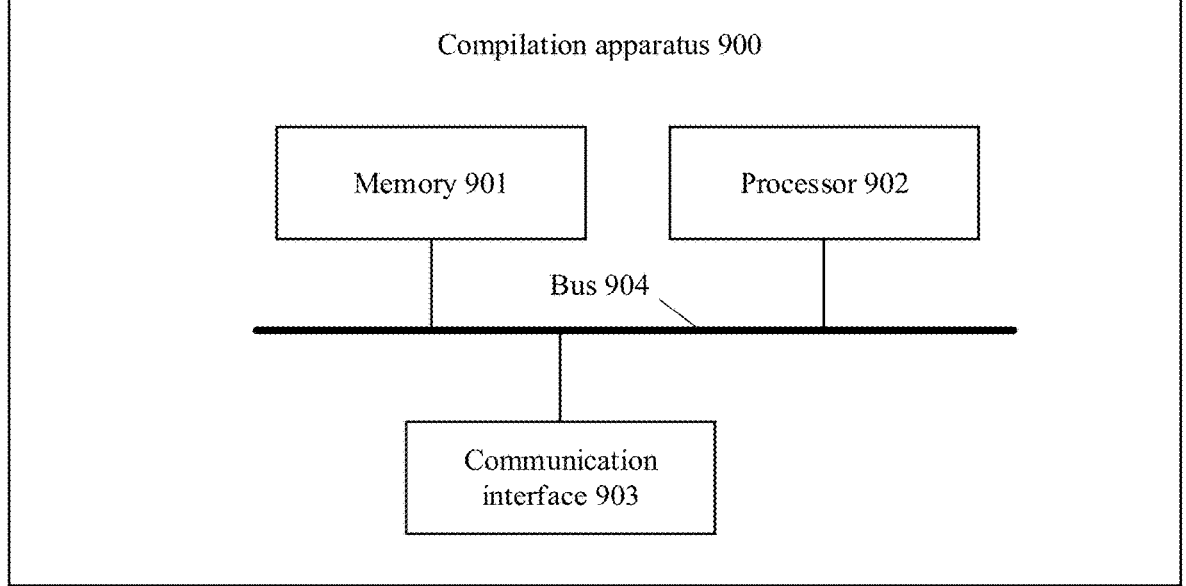
FIG. 9 is a diagram of a hardware structure of a compilation apparatus according to an embodiment of this application.

FIG. 9 is a diagram of a hardware structure of a compilation apparatus according to an embodiment of this application. As shown in FIG. 9, the apparatus may include: a memory 901, one or more (only one is shown in the figure) processors 902, a communication interface 903, and a bus 904. The memory 901, the processor 902, and the communication interface 903 are communicatively connected to each other through the bus 904.

The memory 901 is configured to store instructions. The processor 902 is configured to invoke the instructions stored in the memory 901. The instructions may be a program in the foregoing embodiment 500 and/or 600 of this application.

The processor 902 is configured to obtain the program in the embodiment 500 and/or 600, so as to perform a corresponding compilation method in the embodiment 500 and/or 600.

According to the compilation apparatus in this embodiment of this application, the compilation method in this embodiment of this application can be used in a compilation phase to perform irregular partition on multi-dimensional data to eliminate a conditional inequality in a program so that an obtained program compilation result has high instruction transmission efficiency in a mapping process, a code length in the program compilation result is reduced, and short mapping duration is obtained for the program compilation result.

It should be understood that the apparatus 900 may be a computer, and may be configured to perform steps and/or procedures corresponding to a compiler in the foregoing method embodiment 500 and the embodiment 600.

The memory 901 may be a read-only memory (ROM), a static storage device, a dynamic storage device, or a random access memory (RAM). The memory 901 may store a program. When the program stored in the memory 901 is executed by the processor 902, the processor 902 and communication interface 903 are configured to perform the steps of the compilation method in embodiments of this application.

The processor 902 may be a general-purpose central processing unit (CPU), a microprocessor, an application-specific integrated circuit (ASIC), a graphics processing unit (GPU), or one or more integrated circuits, to execute a related program to implement functions required to be performed by units in the compilation apparatus in this embodiment of this application, or perform the compilation method in the method embodiments of this application.

The processor 902 may alternatively be an integrated circuit chip having a signal processing capability. In an implementation process, the steps of the compilation method in this application may be completed by using instructions in a form of software in the processor 902. The processor 902 may alternatively be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps and logical block diagrams disclosed in embodiments of this application. The general-purpose processor may be a microprocessor, or the processor may be any conventional processor. The steps of the methods disclosed with reference to embodiments of this application may be directly implemented by a hardware decoding processor, or may be implemented by a combination of hardware and software modules in a decoding processor. The software module may be located in a storage medium, for example, a random access memory, a flash memory, a read-only memory, a programmable read-only memory, an electrically erasable programmable memory, or a register. The storage medium is located in the memory 901. The processor 902 reads information in the memory 901, and in combination with hardware of the processor 902, completes the functions that need to be performed by the units included in the compilation apparatus in embodiments of this application, or performs the compilation method in the method embodiments of this application.

The communication interface 903 implements communication between the apparatus 900 and another device or a communication network by using a transceiver apparatus, for example, a transceiver. For example, the program may be obtained through the communication interface 903.

The bus 904 may include a path for information transfer between various components (for example, the memory 901, the processor 902, and the communication interface 903) of the apparatus 900.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts shown as units may or may not be physical units, may be located in one place, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or a part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are implementations of this application, and the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A program compilation method, comprising:

obtaining a first program, the first program comprising a plurality of layers of loop statements, a loop condition of each layer of loop statement in the plurality of layers of loop statements comprising a variable and a value interval of the variable, and a loop body of the plurality of layers of loop statements comprising at least one conditional statement, the plurality of layers of loop statements comprise a first loop statement, the first loop statement comprising a layer of loop statement in the plurality of layers of loop statements, a variable comprised in a loop condition of the first loop statement comprising a first variable, and the first variable comprising one of variables comprised in a first conditional statement in the at least one conditional statement;

processing a value interval of the first variable in the first loop statement to obtain at least one loop statement corresponding to the first loop statement, the at least one loop statement comprises a second loop statement, both the first loop statement and the second loop statement comprising the first variable, a value interval of the first variable in the second loop statement comprising a first interval, the first interval comprising a subset of the value interval of the first variable in the first loop statement, and the first interval making the first conditional statement always true; and compiling the first program based on the at least one loop statement to obtain a compilation result of the first program, the compilation result of the first program being related to the at least one loop statement; and wherein the first program comprises an instruction mapping label; and when an estimated mapping time of the compilation result of the first program is greater than a preset time, the first variable is one of the variables comprised in both the at least one conditional statement and loop conditions of loop statements following the instruction mapping label, and the estimated mapping time is required for mapping the compilation result of the first program to an executable instruction on hardware; or when the estimated mapping time of the compilation result of the first program is less than or equal to the preset time, the first variable is the one of the variables comprised in both the at least one conditional statement and loop conditions of all of the plurality of layers of loop statements.

2. The method according to claim 1, wherein the estimated mapping time of the compilation result of the first program is determined based on one or more of a quantity of variables comprised in the at least one conditional statement, a quantity of layers of the plurality of layers of loop statements, fuzzy intervals of the variables comprised in the at least one conditional statement, or a quantity of conditional statements; and when a value of the variable is a value in a fuzzy interval of the variable, whether a conditional statement comprising the variable is true is further related to another factor.

3. The method according to claim 1, wherein the at least one loop statement corresponding to the first loop statement further comprises a third loop statement, wherein:

a value interval of the first variable in the third loop statement is a second interval, and when a value of the first variable is a value in the second interval, whether the first conditional statement is true is further related to another factor.

4. The method according to claim 3, wherein the first conditional statement further comprises a second variable, and the method further comprises:

processing the second interval of the first variable in the third loop statement to obtain one or more fourth loop statements when the estimated mapping time of the compilation result of the first program is greater than the preset time and the second variable is one of the variables comprised in both the at least one conditional statement and the loop conditions of the loop statements following the instruction mapping label, or when the estimated mapping time of the compilation result of the first program is less than or equal to the preset time and the second variable is one of the variables comprised in both the at least one conditional statement and the loop conditions of all of the plurality of layers of loop statements;

wherein a value interval of the first variable in each of the fourth loop statements is a subset of the second interval.

5. The method according to claim 3, wherein the first conditional statement further comprises a second variable, a value interval of the second variable in the third loop statement comprises a third interval; the method further comprising:

processing the third interval in the third loop statement to obtain one or more fifth loop statements when the estimated mapping time of the compilation result of the first program is greater than the preset time, and the second variable is a variable comprised in a loop condition of a loop statement above the instruction mapping label;

wherein a value interval of the second variable in each of the fifth loop statements is a subset of the third interval.

6. The method according to claim 1, wherein two endpoints of the value interval of the variable comprised in the loop condition of each layer of loop statement are constants, and the variables comprised in the at least one conditional statement are variables comprised in loop conditions of the plurality of layers of loop statements.

7. A chip system, comprising:

an interface circuit;

a memory storing instructions; and at least one processor in communication with the memory and the interface circuit, the at least one processor configured, upon execution of the instructions, to perform the following steps:

obtaining a first program, the first program comprising a plurality of layers of loop statements, a loop condition of each layer of loop statement in the plurality of layers of loop statements comprising a variable and a value interval of the variable, and a loop body of the plurality of layers of loop statements comprising at least one conditional statement, the plurality of layers of loop statements comprise a first loop statement, the first loop statement comprising a layer of loop statement in the plurality of layers of loop statements, a variable comprised in a loop condition of the first loop statement comprising a first variable, and the first variable is one of variables comprised in a first conditional statement in the at least one conditional statement;

processing a value interval of the first variable in the first loop statement to obtain at least one loop statement corresponding to the first loop statement, the at least one loop statement comprises a second loop statement, both the first loop statement and the second loop statement comprising the first variable, a value interval of the first variable in the second loop statement comprising a first interval, the first interval comprising a subset of the value interval of the first variable in the first loop statement, and the first interval making the first conditional statement always true; and compiling the first program based on the at least one loop statement to obtain a compilation result of the first program, the compilation result of the first program being related to the at least one loop statement; and wherein the first program comprises an instruction mapping label; and when an estimated mapping time of the compilation result of the first program is greater than a preset time, the first variable is one of the variables comprised in both the at least one conditional statement and loop conditions of loop statements following the instruction mapping label, and the estimated mapping time is required for mapping the compilation result of the first program to an executable instruction on hardware; or when the estimated mapping time of the compilation result of the first program is less than or equal to the preset time, the first variable is the one of the variables comprised in both the at least one conditional statement and loop conditions of all of the plurality of layers of loop statements.

8. The chip system according to claim 7, wherein the estimated mapping time of the compilation result of the first program is determined based on one or more of a quantity of variables comprised in the at least one conditional statement, a quantity of layers of the plurality of layers of loop statements, fuzzy intervals of the variables comprised in the at least one conditional statement, or a quantity of conditional statements; and when a value of the variable is a value in a fuzzy interval of the variable, whether a conditional statement comprising the variable is true is further related to another factor.

9. The chip system according to claim 7, wherein the at least one loop statement corresponding to the first loop statement further comprises a third loop statement, wherein:

a value interval of the first variable in the third loop statement is a second interval, and when a value of the first variable is a value in the second interval, whether the first conditional statement is true is further related to another factor.

10. The chip system according to claim 7 wherein a discrete device is coupled to the chip system to form a compilation apparatus.

11. A non-transitory computer-readable media storing computer instructions that configure at least one processor, upon execution of the instructions, to perform the following steps:

obtaining a first program, the first program comprising a plurality of layers of loop statements, a loop condition of each layer of loop statement in the plurality of layers of loop statements comprising a variable and a value interval of the variable, and a loop body of the plurality of layers of loop statements comprising at least one conditional statement, the plurality of layers of loop statements comprise a first loop statement, the first loop statement comprising a layer of loop statement in the plurality of layers of loop statements, a variable comprised in a loop condition of the first loop statement comprising a first variable, and the first variable comprising one of variables comprised in a first conditional statement in the at least one conditional statement;

processing a value interval of the first variable in the first loop statement to obtain at least one loop statement corresponding to the first loop statement, the at least one loop statement comprises a second loop statement, both the first loop statement and the second loop statement comprising the first variable, a value interval of the first variable in the second loop statement comprising a first interval, the first interval comprising a subset of the value interval of the first variable in the first loop statement, and the first interval making the first conditional statement always true; and compiling the first program based on the at least one loop statement to obtain a compilation result of the first program, the compilation result of the first program being related to the at least one loop statement; and wherein the first program comprises an instruction mapping label; and when an estimated mapping time of the compilation result of the first program is greater than a preset time, the first variable is one of the variables comprised in both the at least one conditional statement and loop conditions of loop statements following the instruction mapping label, and the estimated mapping time is required for mapping the compilation result of the first program to an executable instruction on hardware; or when the estimated mapping time of the compilation result of the first program is less than or equal to the preset time, the first variable is the one of the variables comprised in both the at least one conditional statement and loop conditions of all of the plurality of layers of loop statements.

12. The non-transitory computer-readable media according to claim 11, wherein the estimated mapping time of the compilation result of the first program is determined based on one or more of a quantity of variables comprised in the at least one conditional statement, a quantity of layers of the plurality of layers of loop statements, fuzzy intervals of the variables comprised in the at least one conditional statement, or a quantity of conditional statements; and when a value of the variable is a value in a fuzzy interval of the variable, whether a conditional statement comprising the variable is true is further related to another factor.

13. The non-transitory computer-readable media according to claim 11, wherein the at least one loop statement corresponding to the first loop statement further comprises a third loop statement, wherein:

a value interval of the first variable in the third loop statement is a second interval, and when a value of the first variable is a value in the second interval, whether the first conditional statement is true is further related to another factor.

* * * * *